US010574884B2

(12) United States Patent
Shimauchi et al.

(10) Patent No.: US 10,574,884 B2
(45) Date of Patent: Feb. 25, 2020

(54) IMAGE PROCESSING APPARATUS, IMAGE PROCESSING METHOD, PROGRAM, AND IMAGE PICKUP SYSTEM

(71) Applicant: Sony Corporation, Tokyo (JP)

(72) Inventors: Kazuhiro Shimauchi, Tokyo (JP); Daisuke Tahara, Tokyo (JP); Nobuho Ikeda, Kanagawa (JP); Atsushi Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/750,301

(22) PCT Filed: Jul. 14, 2016

(86) PCT No.: PCT/JP2016/070867
§ 371 (c)(1),
(2) Date: Feb. 5, 2018

(87) PCT Pub. No.: WO2017/047219
PCT Pub. Date: Mar. 23, 2017

(65) Prior Publication Data
US 2018/0227485 A1 Aug. 9, 2018

(30) Foreign Application Priority Data
Sep. 18, 2015 (JP) .................. 2015-184612

(51) Int. Cl.
H04N 5/232 (2006.01)
G03B 37/04 (2006.01)
(52) U.S. Cl.
CPC ......... H04N 5/23238 (2013.01); G03B 37/04 (2013.01); H04N 5/23229 (2013.01); H04N 5/23251 (2013.01)
(58) Field of Classification Search
None
See application file for complete search history.

(56) References Cited

U.S. PATENT DOCUMENTS

2007/0132863 A1* 6/2007 Deguchi ............... G06T 3/4038
348/239
2009/0058990 A1* 3/2009 Kim ...................... G03B 37/04
348/36
(Continued)

FOREIGN PATENT DOCUMENTS

CN 102572492 A 7/2012
CN 103312975 A 9/2013
(Continued)

OTHER PUBLICATIONS

Extended European Search Report dated Mar. 25, 2019 for corresponding European Application No. 16846092.1.
(Continued)

Primary Examiner — Janese Duley
(74) Attorney, Agent, or Firm — Michael Best & Friedrich LLP

(57) ABSTRACT

An image pickup apparatus, image processing apparatus and corresponding program and method are disclosed. In one example, a second captured image acquired from another apparatus is aligned with a first captured image. Image stabilization is carried out in response to a positional relation between the captured images. For example, when overlapping between the captured images is equal to or smaller than an image stabilization limitation threshold value, the image stabilization is stopped or a correction range is limited for at least one of the captured images. When the amount of overlapping is larger than the image stabilization limitation threshold value, the image stabilization for both of the captured images is carried out without limitation. The captured images are aligned with each other by using the captured image with limited image stabilization, or both captured images where stabilization is carried out without limitation, thereby producing a panoramic image.

19 Claims, 26 Drawing Sheets

(56) References Cited

U.S. PATENT DOCUMENTS

| | | | |
|---|---|---|---|
| 2011/0298917 A1 | 12/2011 | Yanagita | |
| 2013/0147910 A1* | 6/2013 | Xin | H04N 5/23238 348/38 |
| 2013/0250044 A1* | 9/2013 | Miyamoto | H04N 5/23238 348/36 |
| 2014/0160234 A1 | 6/2014 | Okuda et al. | |

FOREIGN PATENT DOCUMENTS

| | | |
|---|---|---|
| EP | 2109308 A2 | 10/2009 |
| EP | 2747418 A1 | 6/2014 |
| JP | 10-304246 A | 11/1998 |
| JP | 11-024121 A | 1/1999 |
| JP | 2006-033353 A | 2/2006 |
| JP | 2008-42664 A | 2/2008 |
| JP | 2010-93450 A | 4/2010 |
| JP | 2013-186853 A | 9/2013 |
| JP | 2014-215304 A | 11/2014 |

OTHER PUBLICATIONS

Chinese Office Action dated Dec. 30, 2019 for corresponding Chinese Application No. 201680052271.9.

* cited by examiner

FIG. 1
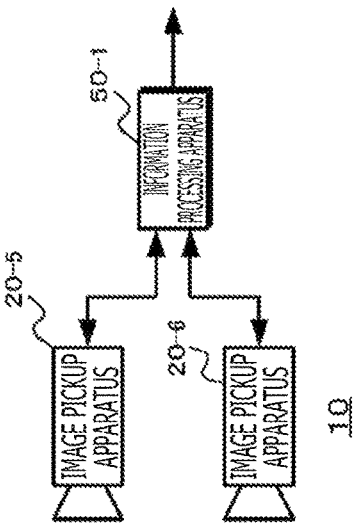
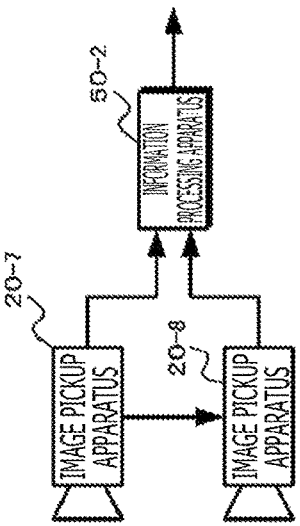
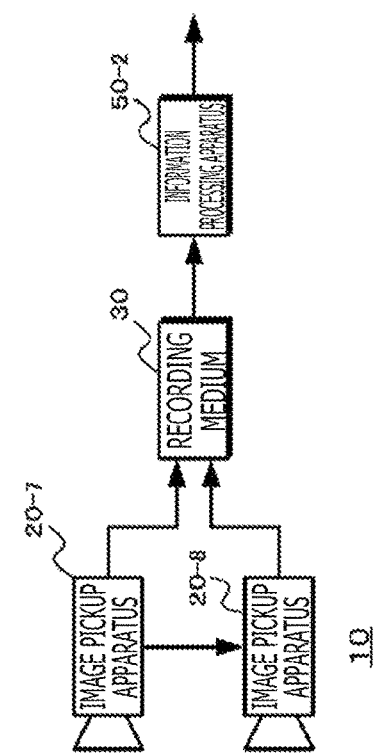
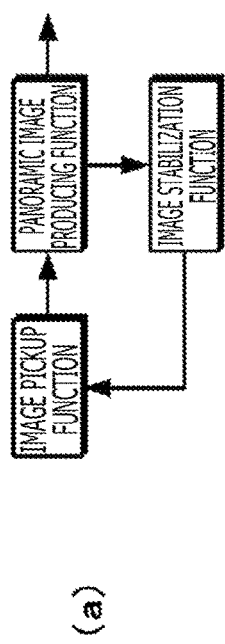
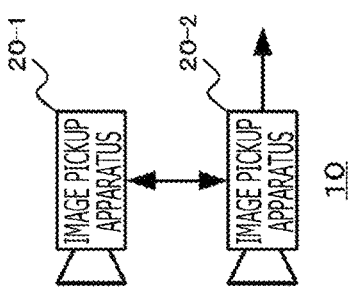
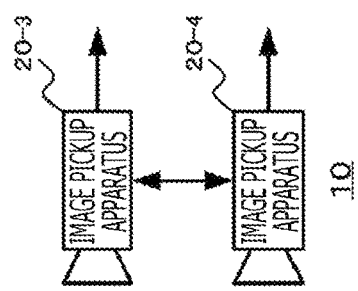

FIG. 4
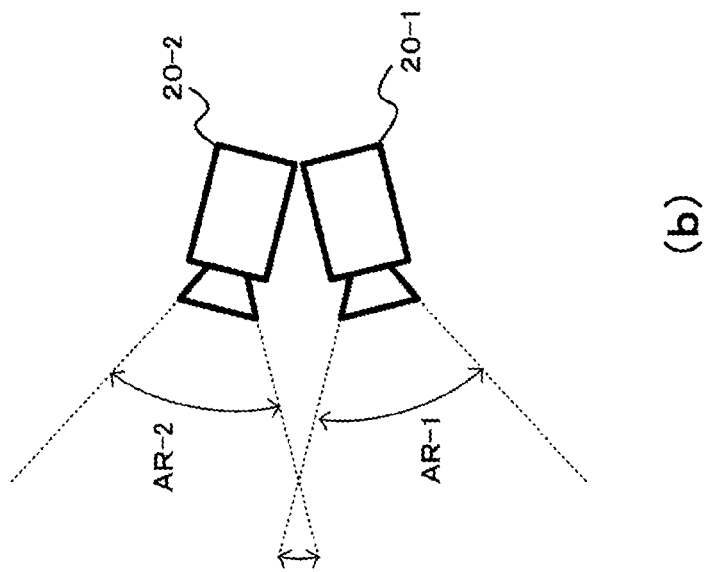
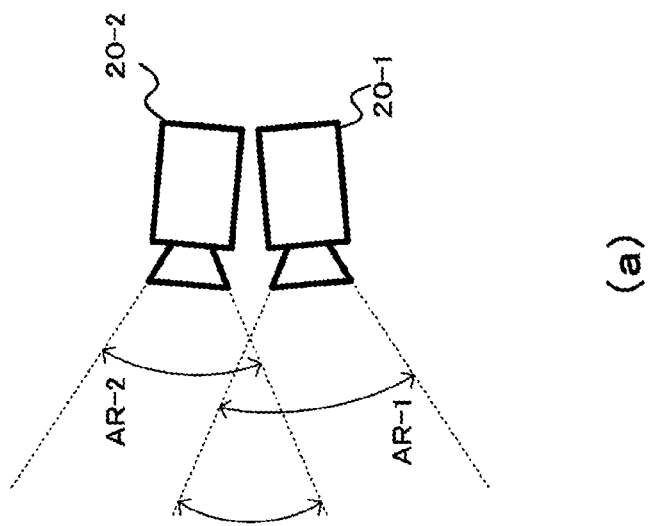

FIG.10
(a)
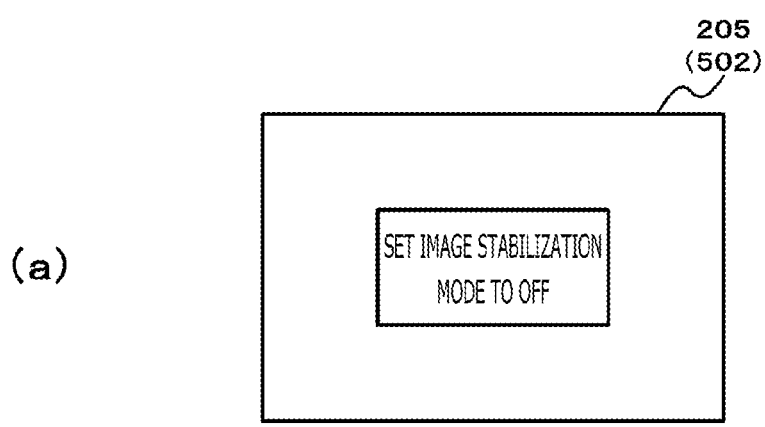
(b)
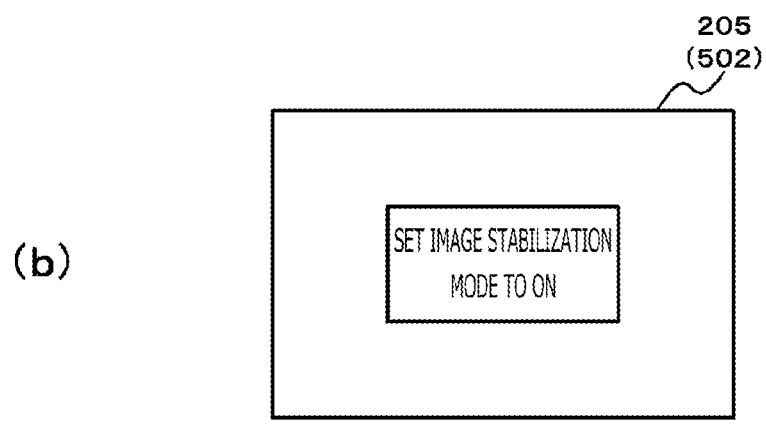

IMAGE PROCESSING APPARATUS, IMAGE PROCESSING METHOD, PROGRAM, AND IMAGE PICKUP SYSTEM

TECHNICAL FIELD

This technique relates to an image processing apparatus, an image processing method, a program, and an image pickup system, and enables a panoramic image to be readily produced.

BACKGROUND ART

Heretofore, in an image pickup apparatus having a plurality of image pickup portions, for example, in an image pickup apparatus of PTL 1, images for output have been segmented from a plurality of images in a common segmentation size with an initial optical axis center before image stabilization in a plurality of image pickup portions as a reference. In addition, a binocular vision can be obtained by an image for output in which an optical axis center position is held prior to and after the image stabilization.

CITATION LIST

Patent Literature

[PTL 1]
WO2011/114572

SUMMARY

Technical Problem

Incidentally, when an image is produced in a plurality of image pickup portions, not limited to a binocular vision, for example, a panoramic image having a wide angle of view can be produced by connecting a plurality of images to one another. However, when images for output which are segmented from a plurality of images in a common segmentation size are intended to be connected to one another with an initial optical axis center as a reference, it is necessary to install precisely a plurality of image pickup apparatuses in a horizontal direction with high accuracy in such a way that the initial optical axis center is prevented from being dispersed in a vertical direction. For this reason, a panoramic image is not readily produced.

Accordingly, an object of this technique is to provide an image processing apparatus, an image processing method, a program, and an image pickup system each of which is capable of readily producing images used in production of a panoramic image.

Solution to Problem

A first aspect of this technique lies in
an image processing apparatus including a control portion configured to carry out control about image stabilization for at least one of a first captured image and a second captured image, which are used in production of a panoramic image, in response to a positional relation between the first captured image and the second captured image.

With this technique, when the first captured image and the second captured image aligned with the first captured image are synthesized to produce the panoramic image, the control about the image stabilization for at least one of the first captured image and the second captured image which are used in the synthesis is carried out in response to the positional relation between the first captured image and the second captured image, for example, the image stabilization is controlled in response to the positional relation. In a limitation of the image stabilization, there are carried out an operation for ON/OFF of the image stabilization, and an operation in which an image production area provided within a valid pixel area of an image sensor used in production of images to be synthesized is increased as an amount of overlapping becomes smaller, and a surplus area as a difference between the valid pixel area and the image production area is reduced to limit the image stabilization. In addition, in the control about the image stabilization, a notification about ON/OFF and the limitation of the image stabilization is made in the form of image or voice for a user.

In addition, when the amount of overlapping is equal to or smaller than a processing order setting threshold value, the control portion carries out the image stabilization after carrying out the position alignment between the first captured image and the second captured image. When the amount of overlapping is larger than the processing order setting threshold value, the control portion carries out the position alignment between the first captured image and the second captured image after carrying out the image stabilization. A panoramic image producing portion synthesizes images of the image production areas in the first captured image and the second captured image after the image stabilization and the position alignment. Moreover, the control portion carries out the position alignment between the first captured image and the second captured image in response to a degree of a change in positional relation between an image pickup portion which produces the first captured image and an image pickup portion which produces the second captured image. Thus, the control portion shortens either an observation time period or an observation interval as the degree of the change becomes larger, and lengthens either the observation time period or the observation interval as the degree of the change becomes smaller. In addition, the control portion controls a frequency of the position alignment in response to a result of detection of mounting states of a first image pickup portion for producing the first captured image and a second image pickup portion for producing the second captured image. In addition, the panoramic image producing portion carries out the synthesis by adjusting an image quality difference between an image production area of the first captured image and an image production area of the second captured image. In addition, the panoramic image producing portion synthesizes the image production area of the first captured image in which a lens distortion is corrected, and the image production area of the second captured image in which a lens distortion is corrected. Moreover, the panoramic image producing portion carries out angle-of-view equalization between the first captured image and the second captured image, and synthesizes the first captured image and the second captured image after the angle-of-view equalization.

A second aspect of this technique lies in
an image processing method including, in a control portion, carrying out control about image stabilization for at least one of a first captured image and a second captured image, which are used in production of a panoramic image, in response to a positional relation between the first captured image and the second captured image.

A third aspect of this technique lies in
a program for causing a computer to execute a procedure for carrying out control about image stabilization for at least one of a first captured image and a second captured image, which are used in production of a panoramic image, in response to a positional relation between the first captured image and the second captured image.

Incidentally, the program of the present technique is a program which can be provided for a general-purpose computer which can execute various program codes by a storage medium, a communication medium, for example, a storage medium such as an optical disc, a magnetic disc or a semiconductor memory, or a communication medium such as a network. In this case, the storage medium provides a program in the computer readable form. Such a program is provided in the computer readable form, thereby realizing the processing corresponding to the program on the computer.

A fourth aspect of the present technique lies in an image pickup system including:

a first image pickup portion configured to produce a first captured image to be used in production of a panoramic image;

a second image pickup portion configured to produce a second captured image to be used in production of the panoramic image; and a control portion configured to carry out control about image stabilization for at least one of the first captured image and the second captured image in response to a positional relation between the first captured image and the second captured image.

Advantageous Effect of Invention

According to this technique, the control about the image stabilization for at least one of the first captured image and the second captured image, which are used in production of a panoramic image, is carried out in response to the positional relation between the first captured image and the second captured image. For this reason, by the control about the image stabilization responding to the positional relation between the first captured image and the second captured image, areas in which the captured images of the same object overlap each other can be ensured in the first captured image and the second captured image. Thus, the images used in the production of the panoramic image can be readily produced. It should be noted that the effect described in this description is merely an exemplification, and is by no means limited and additional effects may also be offered.

BRIEF DESCRIPTION OF DRAWINGS

FIG. 1 is a block diagram depicting a configuration of an image pickup system.

FIG. 4 is a view explaining a first embodiment.

FIG. 10 is a diagram exemplifying the case where notification is made for a user by using display.

DESCRIPTION OF EMBODIMENTS

Figure 2:
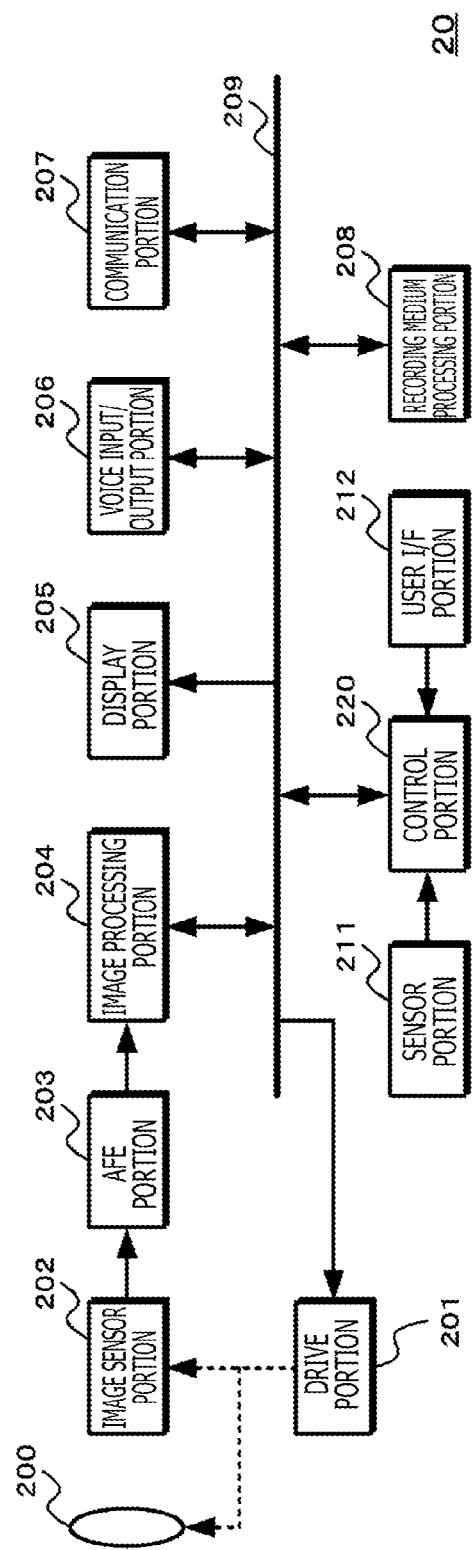
FIG. 2 is a block diagram exemplifying a configuration of an image pickup apparatus.

Hereinafter, modes for carrying out the present technique will be described. It should be noted that the description will be given in the following order.

1. Configuration of image pickup system
2. Configurations of image pickup apparatus and information processing apparatus
  2-1. Configuration of image pickup apparatus
  2-2. Configuration of information processing apparatus
3. First embodiment
  3-1. Operation of first embodiment
  3-2. Other operation of first embodiment
4. Second embodiment
  4-1. Operation of second embodiment
  4-2. Other operation of second embodiment
5. Third embodiment
  5-1. Operation of third embodiment
  5-2. Other operation of third embodiment
6. Fourth embodiment
  6-1. Operation of fourth embodiment
7. Other embodiments 1. Configuration of Image Pickup System FIG. 1 depicts a configuration of an image pickup system using an image processing apparatus of the present technique, and the image pickup system produces a panoramic image by using a plurality of captured images.

The image pickup system, as depicted in (a) of FIG. 1, has an image pickup function of producing a captured image, an image stabilization function of producing a captured image for which shake is corrected, and a panoramic image producing function of producing a panoramic image from a plurality of captured images after the image stabilization. The image pickup function is provided in each of a plurality of image pickup portions. In addition, the image stabilization function may be provided in each of a plurality of image pickup portions, or may be provided in an image pickup apparatus having a predetermined image pickup portion or an electronic apparatus provided separately from each of the image pickup portions, for example, an information processing apparatus or the like. In addition, the panoramic image producing function either may be provided in an image pickup apparatus having a predetermined image pickup portion, or may be provided in an information processing apparatus or the like which is provided separately from each of the image pickup portions. In the production of the panoramic image, either a moving image or a still image is produced.

(b) and (c) of FIG. 1 exemplify the case where an image pickup system 10 is configured by, for example, using two image pickup apparatuses 20-1 and 20-2. The image pickup apparatus 20-1 in (b) of FIG. 1 has either an image pickup function, or an image pickup function and an image stabilization function, and outputs either a captured image or a captured image for which the image stabilization is carried out to the image pickup apparatus 20-2. Incidentally, when the image stabilization function is not provided in the image pickup apparatus 20-1, the image pickup apparatus 20-1 outputs the shake information indicating shake state (such as a motion vector or a movement matrix, for example) to the image pickup apparatus 20-2.

The image pickup apparatus 20-2 has an image pickup function, an image stabilization function and a panoramic image producing function. The image pickup apparatus 20-2 produces a captured image for which the image stabilization is carried out. In addition, when the captured image supplied from the image pickup apparatus 20-1 is yet to be image-stabilized, the image pickup apparatus 20-2 carries out the image stabilization for the captured image supplied thereto from the image pickup apparatus 20-1 on the basis of the shake information from the image pickup apparatus 20-1. Moreover, the image pickup apparatus 20-2 produces a panoramic image by using the respective captured images produced in the image pickup apparatus 20-1 and the image pickup apparatus 20-2.

An image pickup apparatus 20-3 in (c) of FIG. 1 has either the image pickup function, or the image pickup function and the image stabilization function, and outputs either a captured image or a captured image for which the image stabilization is carried out to an image pickup apparatus 20-4 and an information processing apparatus. Incidentally, if the image stabilization function is not provided in the image pickup apparatus 20-3, the image pickup apparatus 20-3 outputs the shake information indicating the shake state together with the captured image to the image pickup apparatus 20-4 and the information processing apparatus.

The image pickup apparatus 20-4 has the image pickup function, or the image pickup function, the image stabilization function and a partial function in the panoramic image producing function. The image pickup apparatus 20-4 outputs either a captured image or a captured image for which the image stabilization is carried out to the information processing apparatus. In addition, when the captured image supplied from the image pickup apparatus 20-3 is yet to be image-stabilized, the image pickup apparatus 20-4 may carry out the image stabilization on the basis of the shake information sent thereto from the image pickup apparatus 20-3. Moreover, the image pickup apparatus 20-4 produces the panoramic information on the basis of both the captured image produced, and the captured image supplied thereto from the image pickup apparatus 20-3, thereby outputting the resulting panoramic information to the information processing apparatus. The panoramic information is information with which one captured image is moved with respect to the other captured image in such a way that a position of an object can be aligned and, for example, is a motion vector, a movement matrix or the like.

When the image pickup system is configured in such a way, the information processing apparatus connects the captured images supplied thereto from the image pickup apparatuses 20-3 and 20-4 to each other on the basis of the panoramic information supplied thereto from the image pickup apparatus 20-4 to produce the panoramic image.

(d) of FIG. 1 exemplifies the case where the image pickup system 10 is configured by, for example, using two image pickup apparatuses 20-5 and 20-6 and an information processing apparatus 50-1, and the information processing apparatus 50-1 controls the operations of the image pickup apparatuses 20-5 and 20-6. The image pickup apparatus 20-5 has either the image pickup function, or the image pickup function and the image stabilization function. The image pickup apparatus 20-5 produces either a captured image, or a captured image for which the image stabilization is carried out on the basis of a control signal sent thereto from the information processing apparatus 50-1, and outputs the resulting captured image to the information processing apparatus 50-1. It should be noted that when the image stabilization function is not provided in the image pickup apparatus 20-5, the image pickup apparatus 20-5 outputs shake information indicating the shake state of the image pickup apparatus 20-5 to the information processing apparatus 50-1.

The image pickup apparatus 20-6 has either the image pickup function, or the image pickup function and the image stabilization function. The image pickup apparatus 20-6 produces either a captured image, or a captured image for which the image stabilization is carried out on the basis of a control signal sent thereto from the information processing apparatus 50-1, and outputs the resulting captured image to the information processing apparatus 50-1. It should be noted that when the image stabilization function is not provided in the image pickup apparatus 20-6, the image pickup apparatus 20-6 outputs shake information indicating the shake state of the image pickup apparatus 20-6 to the information processing apparatus 50-1.

The information processing apparatus 50-1 acquires either the captured image or the captured image for which the image stabilization is carried out from the image pickup apparatuses 20-5 and 20-6 by controlling the image pickup apparatuses 20-5 and 20-6. In addition, when the captured image acquired from the image pickup apparatus 20-5 (20-6) is yet to be image-stabilized, the information processing apparatus 50-1 carries out the image stabilization on the basis of the shake information acquired from the image pickup apparatus 20-5 (20-6). Moreover, the information processing apparatus 50-1 produces the panoramic image by using either the captured image acquired or the captured image, thus acquired, after the image stabilization.

(e) of FIG. 1 exemplifies the case where the image pickup system 10 is configured by, for example, using two image pickup apparatuses 20-7 and 20-8, and an information processing apparatus 50-2, and the information processing apparatus 50-2 controls the operations of the image pickup apparatuses 20-7 and 20-8. The image pickup apparatus 20-7 has either the image pickup function, or the image pickup function and the image stabilization function. The image pickup apparatus 20-7 produces either a captured image, or a captured image for which the image stabilization is carried out on the basis of a control signal sent thereto from the information processing apparatus 50-2, and outputs the resulting captured image to the image pickup apparatus 20-8 and the information processing apparatus 50-2. It should be noted that when the image stabilization function is not provided in the image pickup apparatus 20-7, the image pickup apparatus 20-7 outputs shake information indicating the shake state of the image pickup apparatus 20-5 to the image pickup apparatus 20-8 and the information processing apparatus 50-2.

The image pickup apparatus 20-8 has the image pickup function, or the image pickup function, the image stabilization function, and a partial function in the panoramic image producing function. The image pickup apparatus 20-8 produces either a captured image or a captured image for which the image stabilization is carried out on the basis of a control signal sent thereto from the information processing apparatus 50-2, and outputs the resulting captured image to the information processing apparatus 50-2. In addition, when the captured image supplied from the image pickup apparatus 20-7 is yet to be image-stabilized, the image pickup apparatus 20-8 may carry out the image stabilization on the basis of the shake information supplied thereto from the image pickup apparatus 20-7. Moreover, the image pickup apparatus 20-8 produces the panoramic information on the basis of the captured image produced and the captured image supplied thereto from the image pickup apparatus 20-3, and outputs the resulting panoramic information to the information processing apparatus 50-2. Incidentally, when the image stabilization function is not provided in the image pickup apparatus 20-8, the image pickup apparatus 20-8 outputs the shake information indicating the shake state thereof together with the captured image to the information processing apparatus 50-2.

The information processing apparatus 50-2 acquires either the captured image or the captured image for which the image stabilization is carried out from the image pickup apparatuses 20-7 and 20-8 by controlling the image pickup apparatuses 20-7 and 20-8. In addition, when the captured image acquired from the image pickup apparatus 20-7 (20-8) is yet to be image-stabilized, the information processing apparatus 50-2 carries out the image stabilization on the basis of the shake information acquired from the image pickup apparatus 20-7 (20-8). Moreover, the information processing apparatus 50-2 connects the captured images to each other on the basis of the panoramic information acquired from the image pickup apparatus 20-8 to produce the panoramic image.

Moreover, the image pickup system 10, as depicted in (f) of FIG. 1, may record the captured image, the image stabilization information, and the like in a recording medium 30, and may produce the panoramic image on the basis of the captured image, the image stabilization information, and the like recorded in the recording medium 30.

Incidentally, the configuration of the image pickup system 10 is by no means limited to the configuration described above as long as the configuration has the image pickup function, the image stabilization function, and the panoramic image producing function. In addition, although in the configuration described above, the case where two image pickup apparatuses are used is exemplified, the image pickup system may be configured by using three or more image pickup apparatuses.

2. Configurations of Image Pickup Apparatus and Information Processing Apparatus 2-1. Configuration of Image Pickup Apparatus Next, a configuration of an image pickup apparatus will be described with reference to FIG. 2. An image pickup apparatus 20, for example, is provided with a lens unit 200, a drive portion 201, an image sensor portion 202, an AFE (Analog Front End) portion 203, an image processing portion 204, a display portion 205, a voice input/output portion 206, a communication portion 207, a recording medium processing portion 208, and a bus 209. In addition, the image pickup apparatus 20 is provided with a sensor portion 211, a user interface portion 212, and a control portion 220.

The lens unit 200 is configured by using a focus lens, a zoom lens, and the like, and condenses light made incident thereto from the outside of the image pickup apparatus 20 on the image sensor portion 202 to form an object optical image on an image capturing surface of the image sensor portion 202. The drive portion 201 drives the lenses provided in the lens unit 200 on the basis of a control signal sent thereto from the control portion 220 which will be described later, thereby carrying out focus adjustment and zoom adjustment. In addition, when the image pickup apparatus 20 is to carry out optical image stabilization, for example, image stabilization complying with a lens shift system as the image stabilization, the lens unit 200 is provided with an image stabilization lens. The image pickup apparatus 20 causes the drive portion 201 to drive the image stabilization lens in response to the shake, thereby carrying out the image stabilization. In addition, when the image pickup apparatus 20 is to carry out image stabilization complying with a lens unit swing system (a so-called space optical image stabilization) as optical image stabilization, the image pickup apparatus 20 causes the drive portion 201 to drive the lens unit 200 and the image sensor portion 202, as a unit, in a pitch direction, in a yaw direction or the like with respect to the main body of the image pickup apparatus 20 in response to the shake, thereby carrying out the image stabilization. Moreover, when the image pickup apparatus 20 is to carry out image stabilization complying with an image sensor shift system as the optical image stabilization, the image pickup apparatus 20 causes the drive portion 201 to drive the image sensor portion 202 which will be described later in a direction orthogonal to the optical axis of the lens unit 200 in response to the shake, thereby carrying out the image stabilization.

The image sensor portion 202, for example, is configured by using a CMOS (Complementary Metal Oxide Semiconductor) image sensor or a CCD (Charge Coupled Device) image sensor. The image sensor portion 202 carries out photoelectric conversion to produce a captured image signal corresponding to the object optical image and outputs the resulting captured image signal to the AFE portion 203. In addition, when the image pickup apparatus 20 carries out electronic image stabilization as the image stabilization, the image pickup apparatus 20 moves an image production area as a pixel area from which the image is to be actually extracted within a valid pixel area of the image sensor in response to the shake, thereby carrying out the image stabilization. It should be noted that the electronic image stabilization may also be carried out in the image processing portion 204.

The AFE (Analog Front End) portion 203 executes processing for converting the captured image signal supplied thereto from the image sensor portion 202 into a digital signal, noise removing processing, processing for correcting a defective pixel, or the like, and outputs the captured image signal after the processing to the image processing portion 204.

The image processing portion 204 executes camera signal processing for the captured image signal in such a way that the captured image has excellent image quality. In addition, the image processing portion 204 executes various kinds of processing for the captured image in response to the function of the image pickup apparatus in the image pickup system 10. For example, the image processing portion 204 executes the pieces of processing such as electronic image stabilization, positional alignment in a space direction between the captured images to be connected to each other as will be described later, calculation of an amount of shake, calculation of an amount of overlapping, calculation of an image quality difference, image quality adjustment, calibration, lens distortion correction, projection conversion, angle-of-view equalization, and production of a panoramic image in response to the function of the image pickup apparatus in the image pickup system 10.

The display portion 205 displays thereon various kinds of information, for example, the captured image or the like. The voice input/output portion 206 carries out acquisition of a voice at the time of image capturing, reproduction of the acquired voice, output of a message in the form of voice to the user, and the like.

The communication portion 207, for example, is configured by Wifi, NFC or the like, and makes a communication with other apparatus, for example, other image pickup apparatus, other information processing apparatus or the like. It should be noted that the communication portion 207, not limited to the wireless communication, may also have a configuration in which the communication portion 207 makes a communication with other apparatus through a communication cable.

The recording medium processing portion 208 executes either processing for recording the captured image in a recording medium, or processing for reading out the captured image recorded in the recording medium. It should be noted that the recording medium either may be fixed to the image pickup apparatus 20 or may be detachable.

The bus 209 electrically connects the portions described above to the control portion 220 which will be described later.

The sensor portion 211 is provided with various kinds of sensors in such a way that a state or the like of the image pickup apparatus 20 can be detected. For example, the sensor portion 211 is provided with an acceleration sensor, a gyro sensor and the like, and thus detects the shake of the image pickup apparatus. In addition, the sensor portion 211 may also be provided with a distance measuring sensor, a position detecting sensor (for example, a GPS sensor), and the like. The sensor portion 211 outputs the produced sensor information to the control portion 220.

The user interface (I/F) portion 212 produces a manipulation signal responding to a user manipulation or the like, and outputs the resulting manipulation signal to the control portion 220.

The control portion 220 controls the portions in such a way that an operation in a mode responding to the user manipulation or an operation in a mode instructed from an external apparatus is carried out in the image pickup apparatus 20 on the basis of the manipulation signal supplied from the user interface portion 212 or a communication signal supplied from the external apparatus through the communication portion. In addition, the control portion 220 carries out the control on the basis of the sensor information supplied thereto from the sensor portion 211. For example, the control portion 220 controls either the drive portion 201 or the image processing portion 204 in response to the shake, of the image pickup apparatus 20, detected by the sensor portion 211, thereby carrying out the image stabilization. Moreover, the control portion 220 carries out control for the processing executed in the image processing portion 204, control for the order of the processing pieces of the image stabilization and the position alignment in the space direction as will be described later, control for an observation time period or an observation interval of the degree of a change in positional relation between the image pickup apparatuses, parameter adjustment, communication of data such as the control information or the captured image with other image pickup apparatus, and synchronization processing, management or the like of other image pickup apparatus.

It should be noted that the image pickup apparatus 20 is by no means limited to the camera, and it is only necessary that the image pickup apparatus 20 is an apparatus having the image pickup function. For example, the image pickup apparatus 20 may also be a smart phone, a smart tablet or the like.

2-2. Configuration of Information Processing Apparatus

Figure 3:
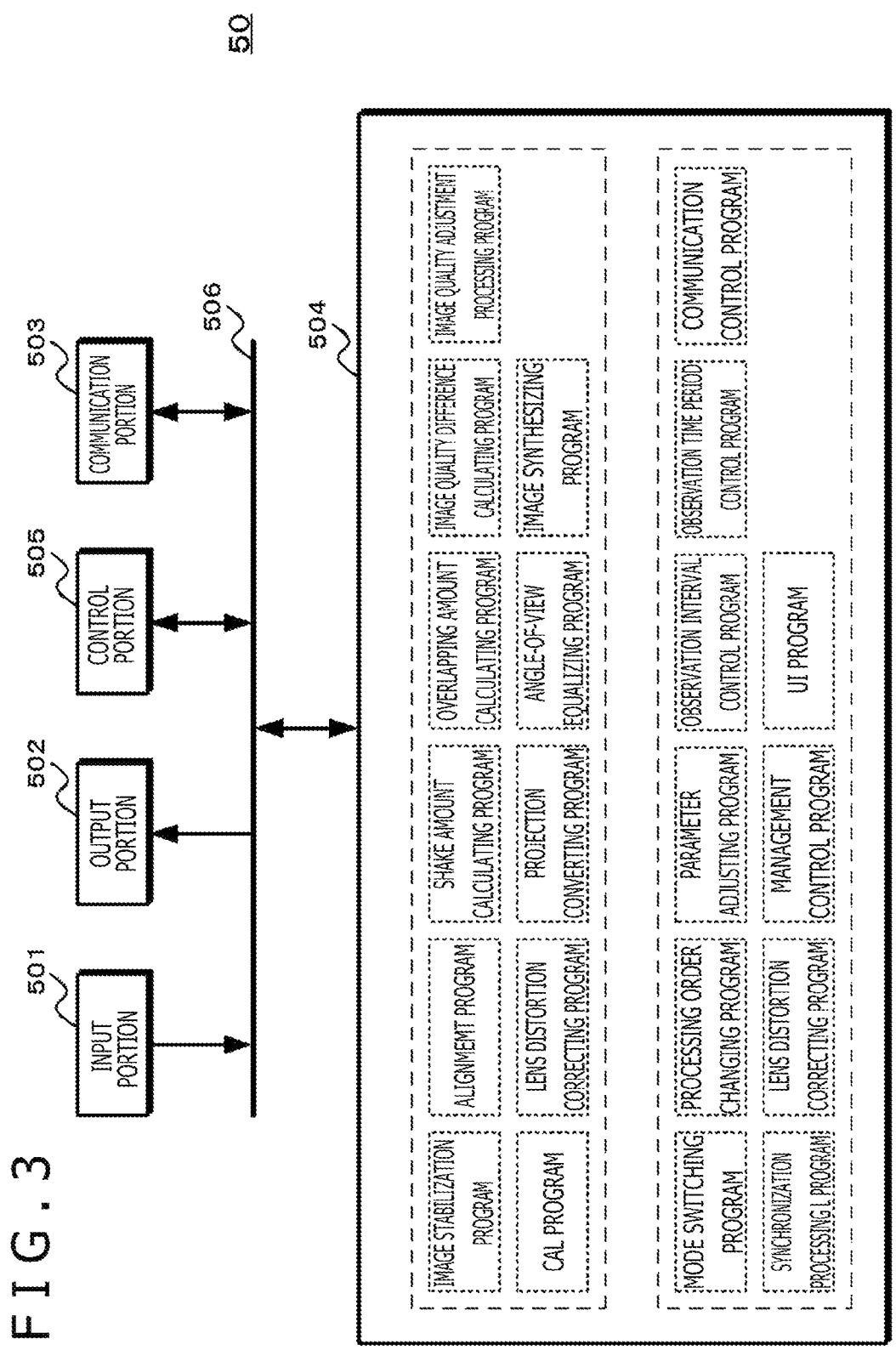
FIG. 3 is a block diagram exemplifying a configuration of an information processing apparatus.

Next, a configuration of the information processing apparatus 50 will be described. FIG. 3 exemplifies a configuration of the information processing apparatus. The information processing apparatus 50 is provided with an input portion 501, an output portion 502, a communication portion 503, a storage portion 504, a control portion 505, and a bus 506. The input portion 501 is a device for accepting an input manipulation from the user, and for example, is a touch panel, a mouse, a key board or the like. The output portion 502 is a device for presenting various kinds of information, and for example, is a display, a speaker or the like.

The communication portion 503 is constituted by, for example, Wifi, NFC or the like, and makes a communication with the image pickup apparatuses 20 or the like. It should be noted that the communication portion 503, not limited to the wireless communication, may also have a configuration in which the communication portion 503 makes a communication with other apparatus through a communication cable.

The storage portion 504 stores therein a program in accordance with which a desired operation is carried out in the information processing apparatus 50. With regard to such a program, there are stored a program, about image processing, in accordance with which the processing similar to that in the image processing portion 204 of the image pickup apparatus 20 is executed, and a program, about operation control or control for the image pickup apparatus, in accordance with which the control similar to that in the control portion 220 is carried out.

With regard to the program about the image processing, there are stored an image stabilization program, a program for position alignment in the space direction, a shake amount calculating program, an overlapping amount calculating program, an image quality difference calculating program, an image quality adjusting program, a calibration program, a lens distortion correcting program, a projection converting program, an angle-of-view equalizing program, a panoramic image producing program, and the like. With regard to the program about the operation control, there are stored a mode switching program, a processing order changing program, a parameter adjusting program, a control program for an observation time period or an observation interval, a communication control program, an inter-image pickup apparatus synchronization processing program, an image pickup apparatus instructing program, an image pickup apparatus management control program, a user interface (UI) program, and the like. It should be noted that the program stored in the storage portion 504 may be a part of these programs, or other programs may also be stored. The program may be acquired from other communication apparatus through a communication network.

The control portion 505 controls the portions in such a way that the program stored in the storage portion 504 is read out to be executed, thereby carrying out the desired operation in the information processing apparatus 50. The bus 506 electrically connects the portions to one another through itself.

3. First Embodiment

Next, a first embodiment will be described. In the production of the panoramic image, the position alignment in the space direction between the captured images to be connected to one another is carried out, and the connection is carried out in such a way that the positions of the objects are not shifted on the connection end sides of the respective captured images. In such a way, the position alignment of the object is carried out and the images are connected to one another, thereby producing the panoramic image. Then, in the first embodiment, the control about the image stabilization for at least one of a first captured image and a second captured image which are used in the production of the panoramic image is carried out in response to the positional relation between the first captured image and the second captured image. In addition, in the first embodiment, the image stabilization is limited in response to the positional relation as the control about the image stabilization. For example, the control about the image stabilization for at least one of the first captured image and the second captured image which are used in the synthesis is carried out in response to the amount of overlapping between the first captured image and the second captured image, and thus the images are connected to each other after the position alignment of the object is carried out, thereby enabling the panoramic image to be produced. It should be noted that in the first embodiment, the electronic image stabilization is carried out as the image stabilization.

FIG. 4 is a view explaining the first embodiment. The first embodiment exemplifies the case where the image capturing is carried out by, for example, using two image pickup apparatuses 20-1 and 20-2. The image pickup apparatus 20-2 acquires duplication identification information, and controls the image stabilization operation of at least one of the image pickup apparatus 20-1 and the image pickup apparatus 20-2 on the basis of the duplication identification information, thereby enabling the images to be connected to each other after the position alignment of the object is carried out. The duplication identification information is information with which an amount of overlapping of the images is calculated and, for example, the captured images are used. In addition, image capturing setting information or the like indicating an image capturing direction or a focal length of the image pickup apparatus may also be used as the duplication identification information. Moreover, when the image pickup apparatuses are mounted to the rig which will be described later, thereby determining an amount of overlapping of the images, and when an amount of overlapping of the images is determined by an mounting angle or the like of the image pickup apparatuses to the rig, rig mounting information indicating that the image pickup apparatuses are mounted to the rig or the rig mounting information indicating the mounting angle can be used as the duplication identification information.

(a) of FIG. 4 depicts the case where the overlapping between the image capturing area (field of view) AR-1 of the image pickup apparatus 20-1 and the image capturing area AR-2 of the image pickup apparatus 20-2 is large. In addition, (b) of FIG. 4 depicts the case where the overlapping between the image capturing area AR-1 of the image pickup apparatus 20-1 and the image capturing area AR-2 of the image pickup apparatus 20-2 is small.

In the case where an amount of overlapping between the image capturing areas is large, even if the image stabilization is carried out for the image pickup apparatus 20-1 and the image pickup apparatus 20-2 and thus the image production area is moved in response to the shake, the image area in which the same object is duplicated can be ensured in many cases. However, when in a state in which an amount of overlapping between the image capturing areas is small and the image stabilization is carried out for the image pickup apparatus 20-1 and the image pickup apparatus 20-2, it is feared that the images cannot be connected to each other after the alignment of the position of the object due to the movement of the image production area responding to the shake. In this case, the panoramic image cannot be produced because the images cannot be connected to each other after the alignment of the position of the object.

Figure 5:
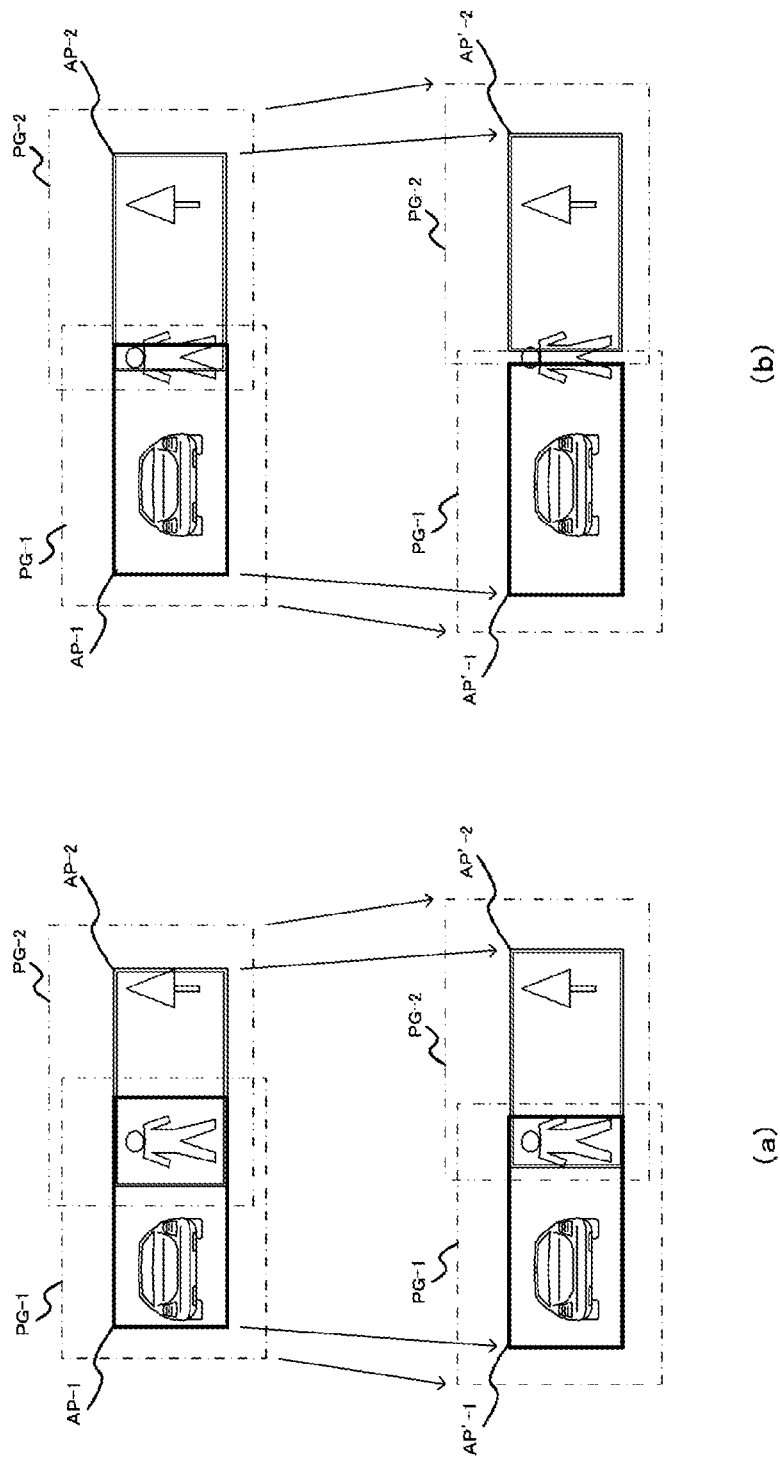
FIG. 5 is a view explaining overlapping and image stabilization for captured images.

FIG. 5 is a view explaining the overlapping of the captured images, and the image stabilization. Incidentally, the images which are to be connected to each other in the production of the panoramic image shall be the image in an image production area AP-1 in a captured image PG-1 in the image capturing area AR-1 acquired in the image pickup apparatus 20-1, and the image in an image production area AP-2 in a captured image PG-2 in the image capturing area AR-2 acquired in the image pickup apparatus 20-2.

It is feared that in the image stabilization, the blurring or the like of the image which has been inconspicuous because of the shake becomes remarkable if the shake is perfectly corrected, and the correction or the like in which a certain level of shake is left is carried out in some cases. For example, even if the image capturing area is moved by the shake, the image stabilization is carried out after the image production area AP-1 and the image production area AP-2 are moved to an image production area AP'-1 and an image production area AP'-2, respectively. Here, when as depicted in (a) of FIG. 5, the overlapping between the captured image PG-1 and the captured image PG-2 is large, the image production area AP'-1 and the image production area AP'-2 are partially duplicated. Therefore, the panoramic image is produced by connecting the image in the image production area AP'-1 and the image in the image production area AP'-2 to each other utilizing the duplication portion after the alignment of the positions of the object. However, when as depicted in (b) of FIG. 5, the overlapping between the captured image PG-1 and the captured image PG-2 is small, even if the captured image PG-1 and the captured image PG-2 are partially duplicated, the image production area AP'-1 and the image production area AP'-2 do not duplicate in some cases. For this reason, the image of the image production area AP'-1 and the image of the image production area AP'-2 cannot be connected to each other with the positions of the object aligned.

Therefore, in the first embodiment, for example, the image pickup apparatus 20-2 determines an amount of overlapping between the captured images, and thus limits the image stabilization of both or either one in response to the amount of overlapping, thereby leaving the image of the same object in both image production areas. As far as the limitation of the image stabilization, the image stabilization may be stopped, or an amount of image stabilization may be limited in response to an amount of overlapping. For example, when the position alignment in the space direction is carried out in such a way that one of the captured image PG-1 and the captured image PG-2 is moved, thereby enabling the position alignment of the object to be carried out with the other captured image, an amount of image stabilization is limited on the basis of a vector (hereinafter referred to as "a position adjustment vector") obtained when one captured image is moved so as to be able to carry out the position alignment of the object with the other captured image.

Figure 6:
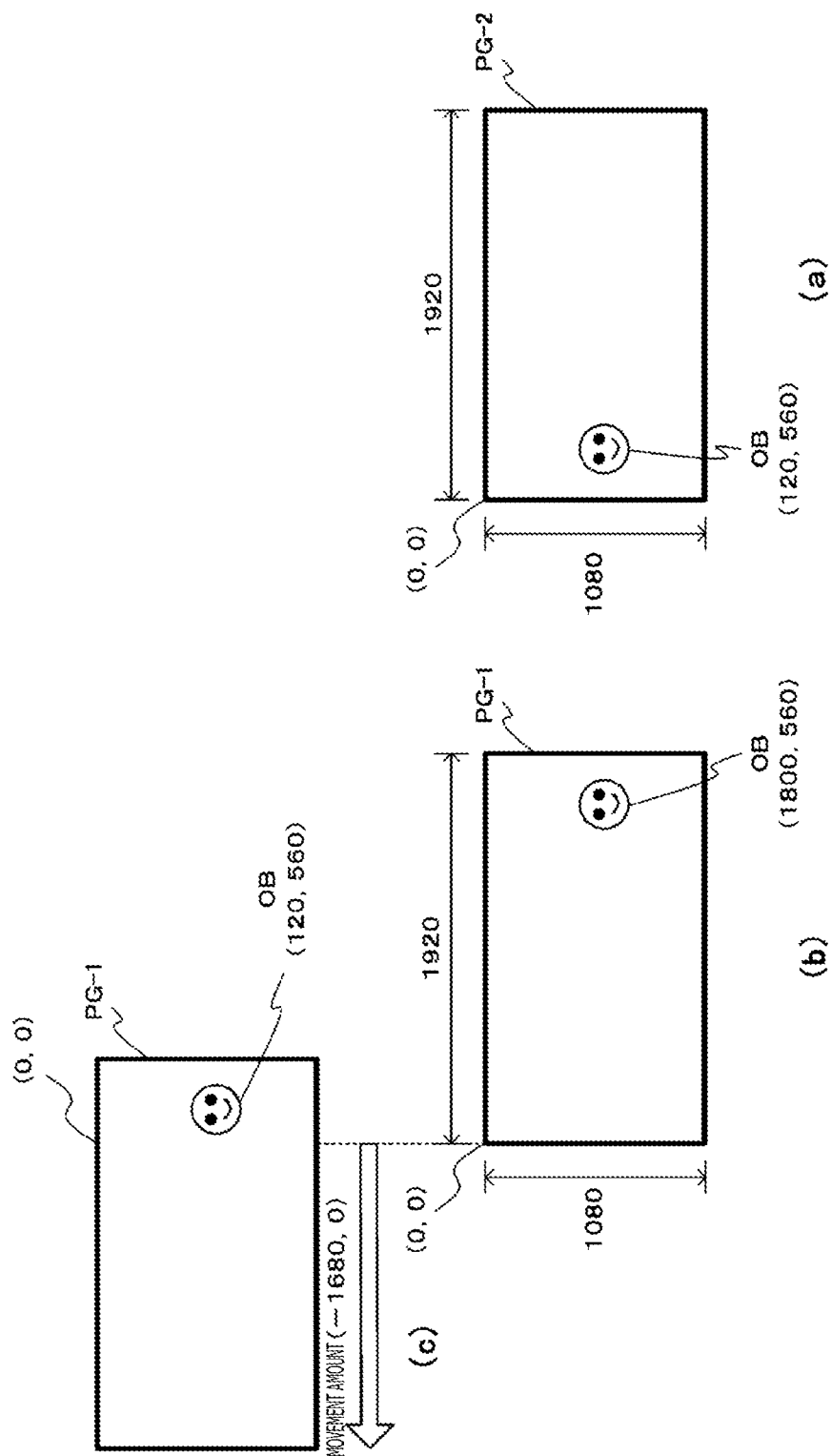
FIG. 6 is a view explaining a position adjustment vector.

Here, the position adjustment vector will be described. As for the position adjustment vector, the area of one of the captured image PG-1 and the captured image PG-2 is moved so as to overlap the area of the other and, for example, an error average value in the overlapping area is calculated. Here, when the positions of the object agree with each other in the overlapping area, the error average value in the overlapping area becomes small. Therefore, an amount of movement to the position where the error average value in the overlapping area is the smallest, and the movement direction are set as the position adjustment vector. FIG. 6 is a view explaining the position adjustment vector. It should be noted that in the figure, each of the sizes of the captured images PG-1 and PG-2 is set as 1920 pixels×1080 pixels. In addition, it is assumed that the coordinate origin for the captured images PG-1 and PG-2 is located in the upper left position, the coordinate position of the object OB is (120, 500) in the captured image PG-2 depicted in (a) of FIG. 6, and the coordinate position of the object OB is (1800, 500) in the captured image PG-1 depicted in (b) of FIG. 6. Here, when the captured image PG-1 is moved to agree in position of the object with the captured image PG-2, if as depicted in (c) of FIG. 6, an amount of movement of the captured image PG-1 is an amount of movement of (−1680, 0), then, the positions of the object agree with each other between the captured image PG-1 and the captured image PG-2. That is to say, a vector with which the captured image PG-1 is moved by an amount of movement of (−1680, 0) is set as the position adjustment vector.

In this way, when the captured image PG-1 and the captured image PG-2 are transversely arranged side by side to be connected to each other in such a way that the positions of the object agree with each other, as an absolute value of a transverse component of the position adjustment vector becomes smaller, a transverse size of the overlapping area becomes larger. Therefore, in the limitation of an amount of image stabilization based on the position adjustment vector, as an amount of movement (absolute value) of the position adjustment vector becomes smaller and thus an amount of overlapping becomes larger, the limitation of the image stabilization is reduced. In addition, there may be adopted a procedure in which the feature points are extracted from the captured image PG-1 and the captured image PG-2 by, for example, using SIFT (Scale-Invariant Feature Transform), SURF (Speeded-Up Robust Features) or the like, and the image stabilization is limited on the basis of the number of feature points (feature point pairs) made to correspond to each other between the captured image PG-1 and the captured image PG-2. Specifically, when the duplicated portion becomes larger between the captured image PG-1 and the captured image PG-2, the number of feature point pairs contained in the duplicated portion also becomes larger. Therefore, as the number of feature point pairs becomes larger, the limitation of the image stabilization is reduced.

Figure 7:
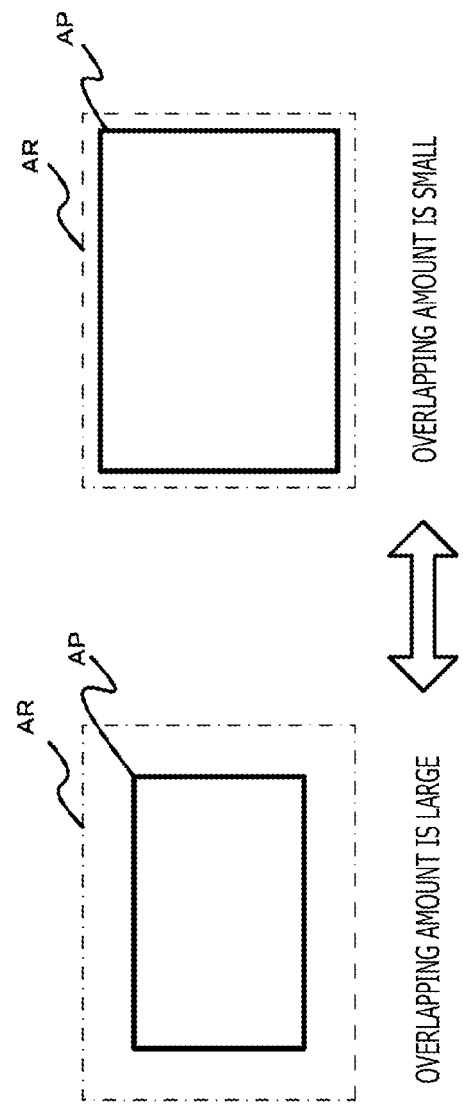
FIG. 7 is a diagram exemplifying the case where an amount of image stabilization is limited in response to an amount of overlapping.

FIG. 7 exemplifies the case where an amount of image stabilization is limited in response to an amount of overlapping. When the overlapping of the image capturing areas (captured images) is small, the image pickup apparatus 20-2 limits a parameter, for example, a size of the image production area in such a way that the image of the same object is contained in both image production areas. Specifically, as an amount of overlapping of the image capturing areas becomes smaller, the size of the image production area AP is increased, and an excessive area as an area difference between a valid pixel area (corresponding to the image capturing area AR) and the image production area AP is reduced. Incidentally, a maximum size of the image production area AP is a size of the valid pixel area. In this way, as an amount of overlapping of the captured images becomes smaller, the excessive area is narrowed and the image stabilization is limited. Thus, the area in which the images of the same object are duplicated can be ensured at the time of the image stabilization in the images in two image production areas to be synthesized. It should be noted that if in the image stabilization, for only one image production area, the size of the image production area is limited in response to an amount of overlapping, then, the sizes of the images segmented from the captured images acquired in the image pickup apparatus 20-1 and the image pickup apparatus 20-2 are different from each other. For this reason, for equalizing the sizes of the images segmented from the captured images, it is only necessary to limit the image stabilization in the respective images. After that, the image pickup apparatus 20-2 synthesizes the image production area AP'-1 and the image production area AP'-2, and connects the images to each other after the object position alignment is carried out, thereby producing the panoramic image. In the production of the panoramic image, if the captured images are projection-converted in a virtual projection surface to be connected to each other, then, the connection of the images can be carried out with high accuracy.

3-1. Operation of First Embodiment

Figure 8:
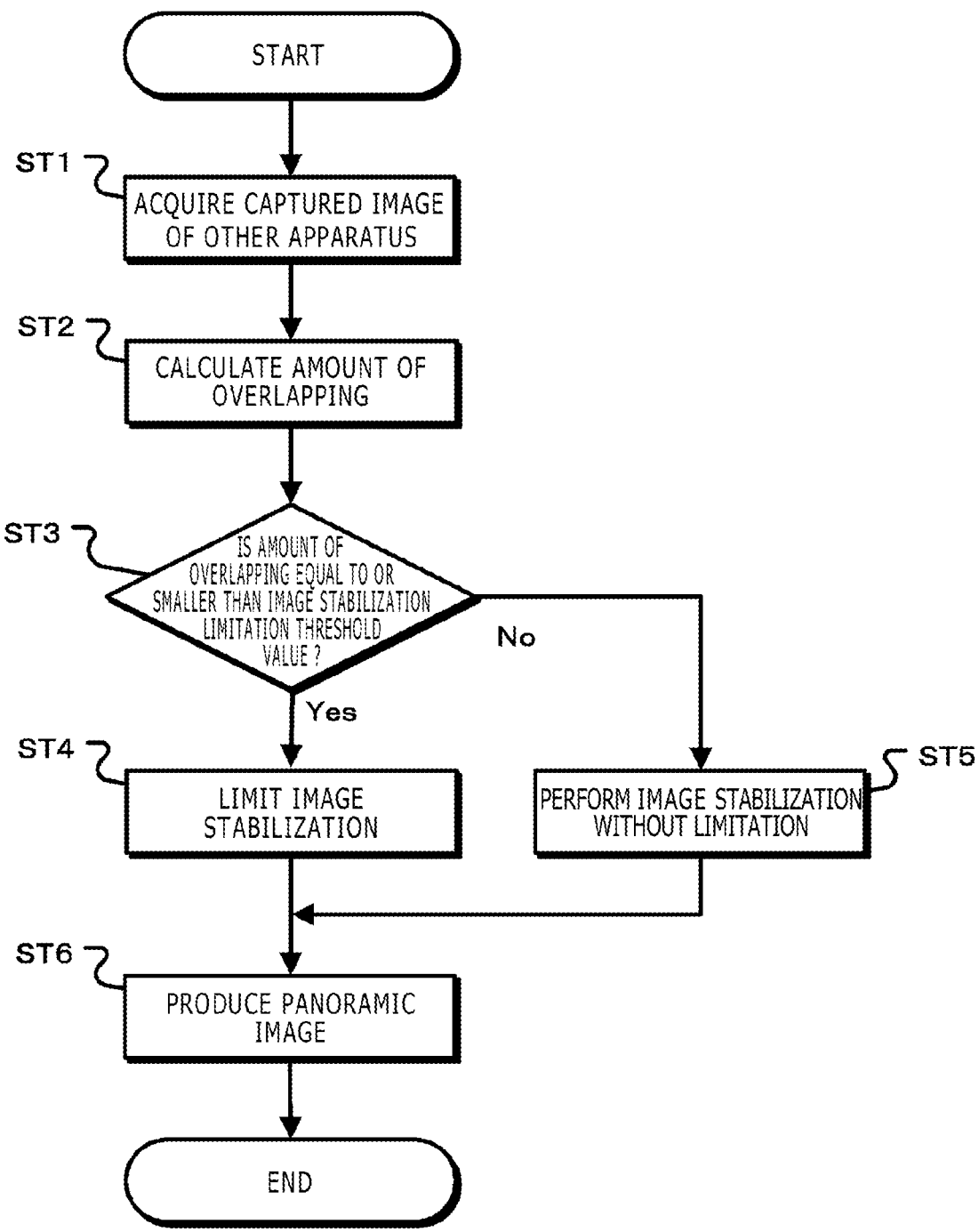
FIG. 8 is a flow chart depicting an operation of the first embodiment.

FIG. 8 is a flow chart depicting an operation of the first embodiment, and it is assumed that the image pickup system 10, for example, has the configuration depicted in (b) of FIG. 1. In addition, it is also assumed that in descriptions as well of flow charts depicting operations of embodiments which will be described later, the image pickup system 10, for example, has the configuration depicted in (b) of FIG. 1.

In Step ST1, the image pickup apparatus 20-2 acquires the captured image of the other apparatus as the duplication identification information. The image pickup apparatus 20-2, for example, acquires the captured image PG-1 in the image capturing area AR-1 produced in the image pickup apparatus 20-1, and processing proceeds to Step ST2.

In Step ST2, the image pickup apparatus 20-2 calculates an amount of overlapping by using the captured image as the duplication identification information. The image pickup apparatus 20-2 carries out the position alignment in the space direction between the captured image PG-2 in the image capturing area AR-2 produced therein, and the captured image PG-1 acquired from the image pickup apparatus 20-1, and calculates an amount of overlapping. For example, the image pickup apparatus 20-2 calculates the size of the position adjustment vector with which one captured image is moved so as to carry out the position alignment of object with the other captured image, the number of feature points overlapping each other, and the like as an amount of overlapping, and the processing proceeds to Step ST3.

In Step ST3, the image pickup apparatus 20-2 judges whether or not the amount of overlapping is equal to or smaller than an image stabilization limitation threshold value. When the image pickup apparatus 20-2 judges that the amount of overlapping calculated in Step ST2 is equal to or smaller than the preset image stabilization limitation threshold value, the processing proceeds to Step ST4. On the other hand, when the image pickup apparatus 20-2 judges that the amount of overlapping is larger than the image stabilization limitation threshold value, the processing proceeds to Step ST5.

In Step ST4, the image pickup apparatus 20-2 limits the image stabilization. The image pickup apparatus 20-2 limits the image stabilization in such a way that the images can be connected to each other after the position alignment of the object is carried out. For example, the image pickup apparatus 20-2 stops the image stabilization of at least one of the image pickup apparatus 20-1 and the image pickup apparatus 20-2. In addition, the image pickup apparatus 20-2 may change a parameter of the image stabilization in response to the amount of overlapping to limit an amount of image stabilization. The image pickup apparatus 20-2, for example, limits the size of the image production area in response to the shake in the manner as described above in such a way that the area in which the images of the same object overlap each other in the captured images after the image stabilization can be ensured. Then, the processing proceeds to Step ST6.

In Step ST5, the image pickup apparatus 20-2 carries out the image stabilization without limitation. The image pickup apparatus 20-2 can connect the images to each other after the position alignment of the object is carried out even when the image stabilization is carried out because the amount of overlapping is large, and carries out the image stabilization without limitation. Then, the processing proceeds to Step ST6.

In Step ST6, the image pickup apparatus 20-2 produces the panoramic image. The image pickup apparatus 20-2 connects the images in the image production areas extracted from the captured images PG-1 and PG-2 to each other after the position alignment of the object is carried out, thereby producing the panoramic image.

In the processing of the flow chart depicted in FIG. 8, when a still image is produced as the panoramic image, that is, at the time of photographing of a still image, the pieces of processing from Step ST1 to Step ST6 are executed once. In addition, when a moving image is produced as the panoramic image, when a monitor image is produced before recording of a still image or a moving image, and so forth, the pieces of processing from Step ST1 to Step ST6 are repetitively executed with a frame as a unit or with a plurality of frames as a unit. Moreover, when the production of the panoramic image is carried out in an off-line, that is, when the production of the panoramic image is not carried out concurrently with the photographing, the pieces of processing from Step ST1 to Step ST5 are executed at the time of the photographing, and the images in the image production areas extracted from the captured images PG-1 and PG-2 are stored in the recording medium. Thereafter, the panoramic image of the still image or the moving image may be produced by using the images recorded in the recording medium. It should be noted that when the production of the panoramic image is carried out in the off-line, the image stabilization information may also be stored in the recording medium.

In addition, although in the operation depicted in FIG. 8, the case where the captured image is used as the duplication identification information is exemplified, the duplication identification information is by no means limited to the captured image. For example, an image capturing range becomes obvious from the image capturing direction or the focal length of the image pickup apparatus. Therefore, an amount of overlapping may be judged by using image capturing setting information indicating the image capturing direction, the focal length or the like of the image pickup apparatus instead of using the captured image from the other apparatus. Then, the pieces of processing of Step ST3, Step ST5, and Step ST6 may be executed by using the judgment result about the amount of overlapping. In addition, in the operation depicted in FIG. 8, the case where when the amount of overlapping is equal to or smaller than the image stabilization limitation threshold value, the image stabilization is limited is exemplified. However, the processing for limiting the amount of image stabilization may be executed in response to the amount of overlapping instead of executing the pieces of processing of Steps ST3, ST4, and ST5.

In such a manner, in the first embodiment, the control about the image stabilization for at least one of the first captured image and the second captured image which are used in the synthesis is carried out in response to the amount of overlapping between the first captured image and the second captured image. For this reason, when the amount of overlapping between the first captured image and the second captured image is small, the image pickup apparatus 20-2 can produce the panoramic image because the image stabilization is limited in such a way the images can be connected to each other after the position alignment of the object is carried out.

3-2. Other Operation of First Embodiment

In the operation of the first embodiment described above, the description has been given with respect to the case where the limitation of the image stabilization is automatically carried out in response to the amount of overlapping between the first captured image and the second captured image. However, the user may carry out the limitation of the image stabilization. Then, in other operation of the first embodiment, a description will be given with respect to the case where the user is notified of the desirable setting on the basis of the calculation result about the amount of overlapping between the first captured image and the second captured image, and the user is allowed to set the limitation of the image stabilization in response to the notification.

The notification to the user is desirably carried out in the form of display and/or voice before the still image or the moving image for production of the panoramic image is captured. The image pickup apparatus 20-2 uses, as a notification processing portion, the display portion 205 when the notification is made in the form of display, and the voice input/output portion 206 when the notification is made in the form of voice.

Figure 9:
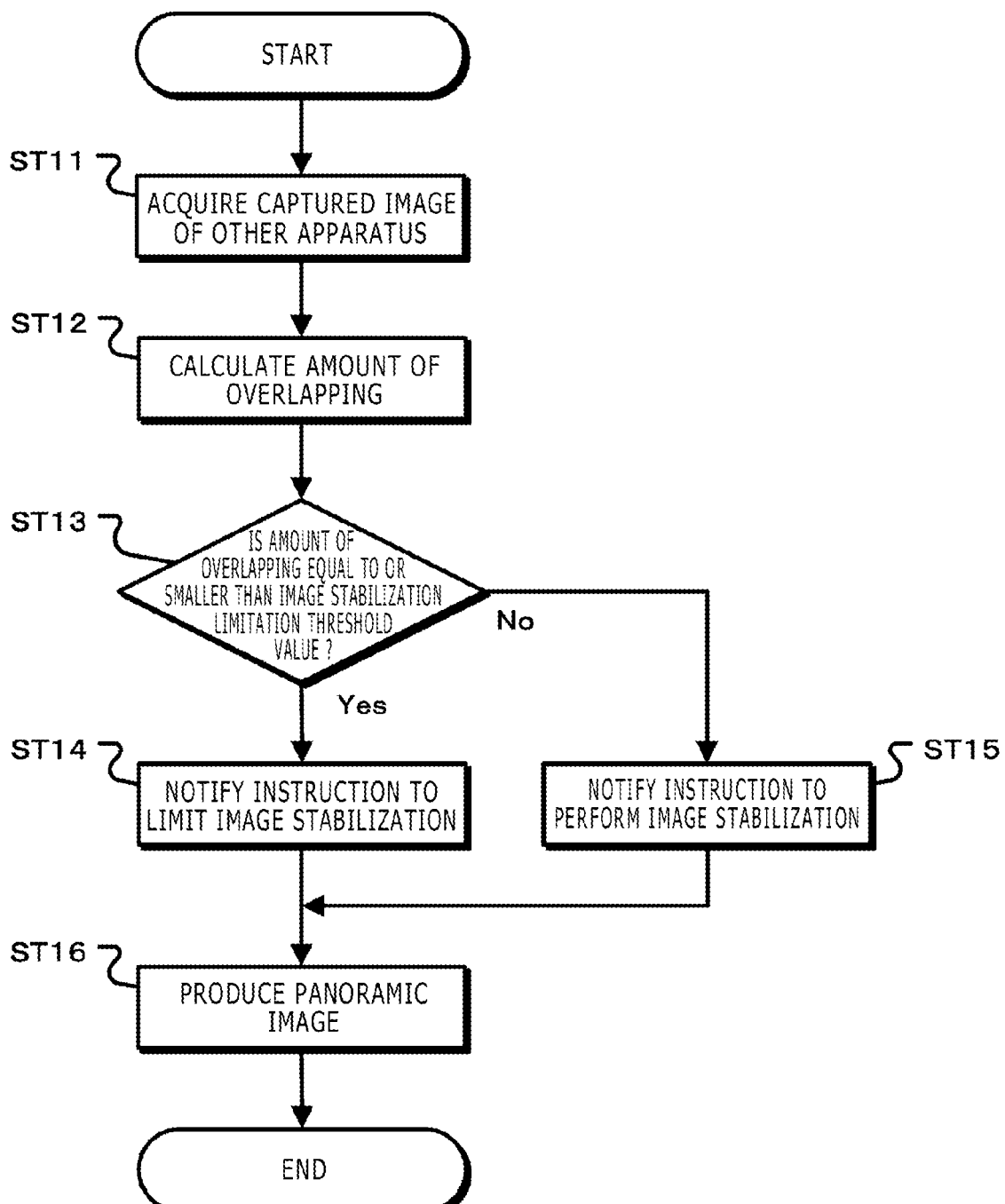
FIG. 9 is a flow chart depicting other operation of the first embodiment.

FIG. 9 is a flow chart depicting other operation of the first embodiment. In Step ST11, the image pickup apparatus 20-2 acquires the captured image from the other apparatus. The image pickup apparatus 20-2, for example, acquires the captured image PG-1, in the image capturing area AR-1, produced in the image pickup apparatus 20-1. Then, the processing proceeds to Step ST12.

In Step ST12, the image pickup apparatus 20-2 calculates an amount of overlapping. The image pickup apparatus 20-2 carries out the position alignment in the space direction between the captured image PG-2 produced and the captured image PG-1 acquired from the image pickup apparatus 20-1, and calculates an amount of overlapping. For example, the image pickup apparatus 20-2 calculates the size of the position adjustment vector with which the positions of the object are made to agree with each other, the number of overlapping feature points, and the like as the amount of overlapping. Then, the processing proceeds to Step ST13.

In Step ST13, the image pickup apparatus 20-2 judges whether or not the amount of overlapping is equal to or smaller than the image stabilization limitation threshold value. When the image pickup apparatus 20-2 judges that the amount of overlapping calculated in Step ST12 is equal to or smaller than the preset image stabilization limitation threshold value, the processing proceeds to Step ST14. When the image pickup apparatus 20-2 judges that the amount of overlapping is larger than the image stabilization limitation threshold value, the processing proceeds to Step ST15.

In Step ST14, the image pickup apparatus 20-2 notifies an instruction to limit the image stabilization. The image pickup apparatus 20-2 notifies the user of the effect that, for example, the image stabilization should be stopped by using the display or the voice. FIG. 10 exemplifies the case where the notification to the user is carried out by using the display. Here, (a) of FIG. 10 depicts a notification of the instruction to limit the image stabilization, and, for example, the user is notified of the effect that the image stabilization mode should be set to an OFF state. In addition, the image pickup apparatus 20-2 may notify the user of the effect that the amount of correction should be limited by changing the parameter of the image stabilization in response to the amount of overlapping. The image pickup apparatus 20-2 carries out the notification of the instruction to limit the image stabilization, and the processing proceeds to Step ST16.

In Step ST15, the image pickup apparatus 20-2 carries out the notification of the instruction to carry out the image stabilization. The image pickup apparatus 20-2 notifies the user of the effect that the image stabilization should be carried out by using the display or the voice. (b) of FIG. 10 depicts the notification of the instruction to carry out the image stabilization, and, for example, notifies the user of the effect that the image stabilization mode should be set to an ON state, and the processing proceeds to Step ST16.

It should be noted that the pieces of processing in Steps ST14 and ST15 may be executed only in the case where the state of the image stabilization mode which is currently set in the image pickup apparatus 20-2 is different from the detection result in Step ST13. For example, when the image stabilization mode which is currently set is an ON state, the instruction notification is carried out in the case of "Yes" in Step ST13. However, no instruction notification is carried out in the case of "No" in Step ST13.

In Step ST16, the image pickup apparatus 20-2 produces the panoramic image. The image pickup apparatus 20-2 connects the images in the image production areas extracted from the captured images PG-1 and PG-2 to each other after the positions of the object are aligned, thereby producing the panoramic image.

It should be noted that although in the operation depicted in FIG. 9, the case where the captured image is used as the duplication identification information is exemplified, the duplication identification information is by no means limited to the captured image. For example, the image capturing range becomes obvious from the image capturing direction or the focal length of the image pickup apparatus. Therefore, the amount of overlapping may be calculated by using the image capturing setting information indicating the image capturing direction or the focal length of the image pickup apparatus as the duplication identification information. In addition, the operation depicted in FIG. 9 exemplifies the case where the image stabilization is limited when the amount of overlapping is equal to or smaller than the image stabilization limitation threshold value. However, instead of executing the pieces of processing Steps ST13, ST14, and ST15, the processing for limiting the amount of image stabilization in response to the amount of overlapping may be executed.

In such a manner, in the operation of the first embodiment, the user is notified of the control about the image stabilization for at least one of the first captured image and the second captured image which are used in the synthesis in response to the amount of overlapping between the first captured image and the second captured image. For this reason, when the amount of overlapping between the first captured image and the second captured image is small, the image pickup apparatus 20-2 limits the image stabilization in such a way that the images in the image production areas can be connected to each other to produce the panoramic image on the basis of the instruction to limit the image stabilization by the user. Therefore, the panoramic image can be produced on the basis of the instruction of the user.

4. Second Embodiment

Next, a second embodiment will be described. When the amount of overlapping between the first captured image and the second captured image is small as described above, it is feared that if the image stabilization is carried out in the image pickup apparatus, then, the areas in which the images of the same object are duplicated cannot be ensured, and thus the position alignment of the same object cannot be carried out to connect the images to each other. Then, in the second embodiment, when the amount of overlapping between the first captured image and the second captured image is small, the positional relation between the captured images provided in the two respective image pickup apparatuses is set as a positional relation in which the position alignment of the same object can be carried out to connect the images to each other, and the image stabilization is carried out in a state in which this positional relation is held. In addition, when the amount of overlapping between the first captured image and the second captured image is large, the image stabilization is carried out and the position alignment in the space direction is carried out by using the captured images after the image stabilization. Moreover, the images in which the image stabilization and the position alignment in the space direction are carried out are synthesized to produce the panoramic image.

4-1. Operation of Second Embodiment

Figure 11:
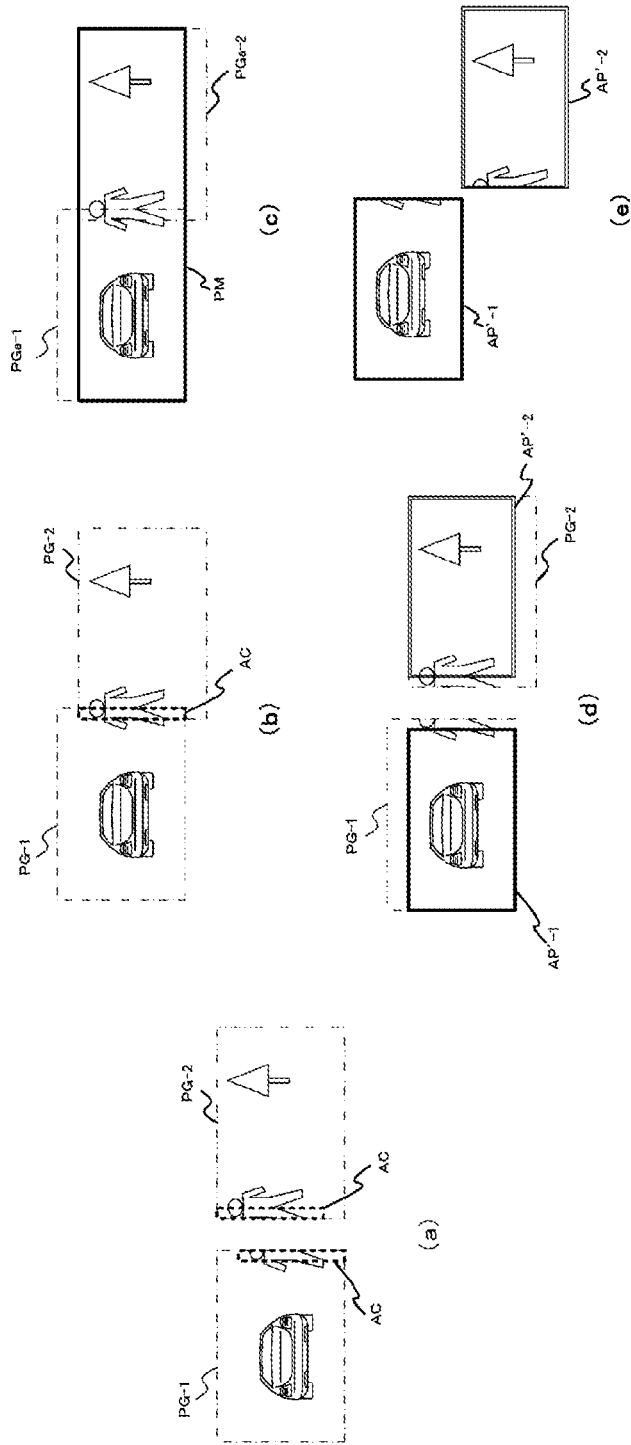
FIG. 11 is a view explaining an operation in the case where an amount of overlapping between captured images is small.

Next, a description will be given with respect to an operation in the case where two image pickup apparatuses are used. FIG. 11 is a view explaining an operation in the case where the amount of overlapping between the captured images is small. (a) of FIG. 11 depicts captured images PG-1 and PG-2. (b) of FIG. 11 depicts the position alignment in the space direction between the captured images. The captured images PG-1 and PG-2 are aligned in such a way that a duplication area AC can be ensured. (c) of FIG. 11 depicts the captured images after the image stabilization. The image stabilization is carried out in such a way that the state after the position alignment is held. Thus, in the captured images PGa-1 and PGa-2 after the image stabilization, a state in which the duplication area is ensured is obtained. Therefore, the position alignment in the space direction between the captured images PGa-1 and PGa-2 in such a way the images of the same object are duplicated. Then, after the position alignment of the same object is carried out, the images are connected to each other, thereby enabling a panoramic image PM to be produced.

Incidentally, (d) of FIG. 11 depicts the case where the image stabilization is carried out without carrying out the position alignment. Here, when the image production areas after the image stabilization for the captured images PG-1 and PG-2, for example, become the image production areas AP'-1 and AP'-2, respectively, as depicted in (e) of FIG. 11, a state in which the duplication area cannot be ensured in the image production areas AP'-1 and AP'-2 is obtained. Therefore, the position alignment of the same object cannot be carried out to connect the images to each other. It should be noted that the position alignment in the space direction of the images is by no means limited to the case where captured images PGa-1 and PGa-2 are used. For example, the captured image PGa-1 may be supplied from the image pickup apparatus 20-1 to the image pickup apparatus 20-2, and the image pickup apparatus 20-2 may align the position of the captured image PGa-1 with the image production area AP'-2 after the image stabilization. In addition, for example, the captured image PGa-1 and the shake information may be supplied from the image pickup apparatus 20-1 to the image pickup apparatus 20-2, and the image pickup apparatus 20-2 may align the position of the captured image PGa-2 with the image production area AP'-1 after the image stabilization based on the shake information.

Figure 12:
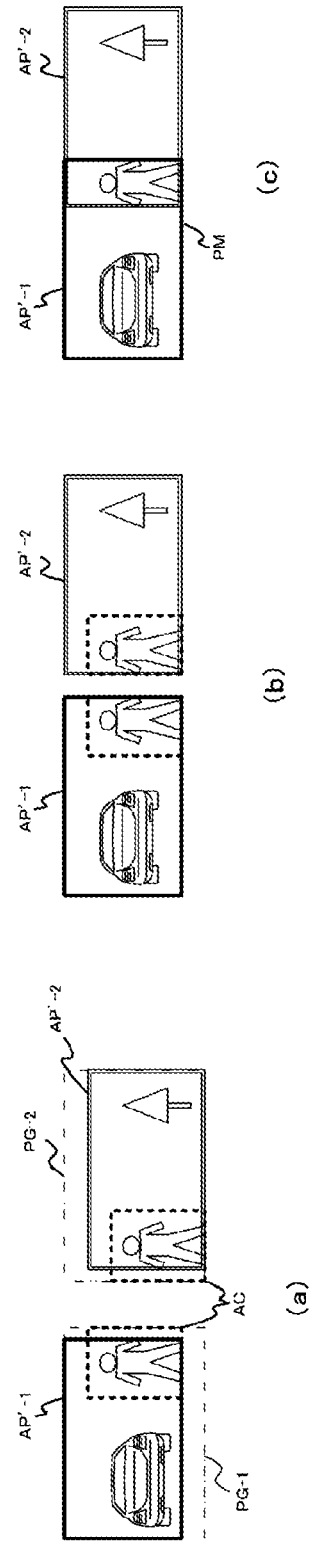
FIG. 12 is a view explaining an operation in the case where an amount of overlapping between captured images is large.

FIG. 12 is a view explaining an operation in the case where the amount of overlapping between the captured images is large. (a) of FIG. 12 depicts image production areas AP'-1 and AP'-2 after the image stabilization in the captured images PG-1 and PG-2. In addition, (b) of FIG. 12 depicts the image production areas AP'-1 and AP'-2 after the image stabilization. In the case where the amount of overlapping between the captured images (image capturing areas) is large, even if the image stabilization is carried out, the duplication areas AC in which the images of the same object are duplicated are ensured in the image production areas AP'-1 and AP'-2. Therefore, as depicted in (c) of FIG. 12, the images in the image production areas AP'-1 and AP'-2 can be connected to each other in such a way that the images of the same object are duplicated, thereby producing the panoramic image PM. In addition, the position alignment is carried out by using the image production areas AP'-1 and AP'-2 after the image stabilization, thereby enabling the search range of the position alignment to be reduced as compared with the case where the position alignment is carried out by using the captured images PG-1 and PG-2.

Figure 13:
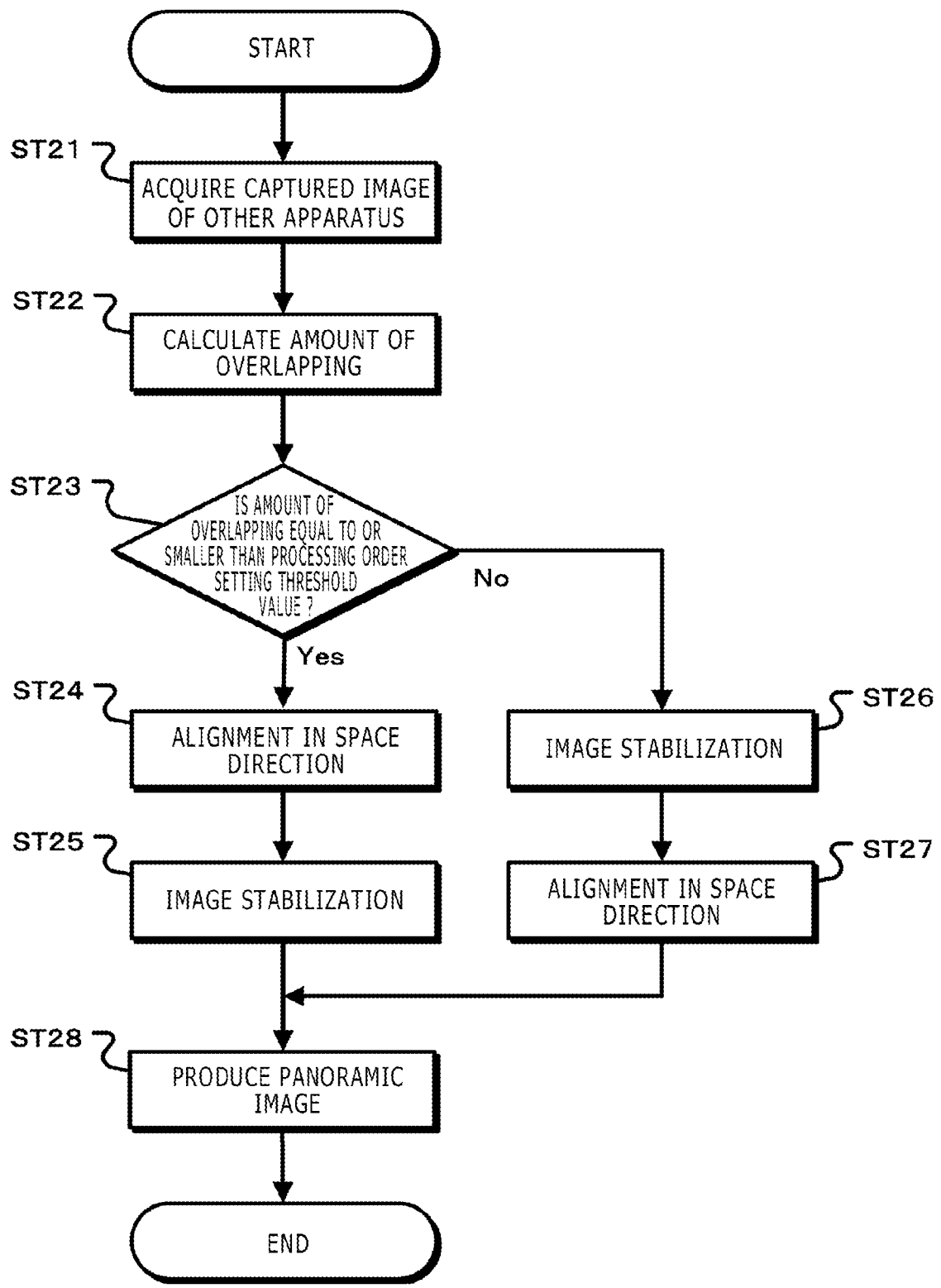
FIG. 13 is a flow chart depicting an operation of a second embodiment.

FIG. 13 is a flow chart depicting the operation of the second embodiment. In Step ST21, the image pickup apparatus 20-2 acquires the captured image from the other apparatus. The image pickup apparatus 20-2, for example, acquires the captured image PG-1, in the image capturing area AR-1, produced in the image pickup apparatus 20-1, and the processing proceeds to Step ST22.

In Step ST22, the image pickup apparatus 20-2 calculates the amount of overlapping. The image pickup apparatus 20-2 carries out the position alignment in the space direction between the captured image PG-2 produced and the captured image PG-1 acquired from the image pickup apparatus 20-1, and calculates the amount of overlapping. For example, the image pickup apparatus 20-2 calculates the size of the position adjustment vector with which the images of the same object overlap each other, the number of overlapping feature points, and the like as the amount of overlapping. Then, the processing proceeds to Step ST23.

In Step ST23, the image pickup apparatus 20-2 judges whether or not the amount of overlapping is equal to or smaller than the processing order setting threshold value. When the image pickup apparatus 20-2 judges that the amount of overlapping calculated in Step ST22 is equal to or smaller than the preset processing order setting threshold value, the processing proceeds to Step ST24. On the other hand, when the image pickup apparatus 20-2 judges that the amount of overlapping calculated in Step ST22 is larger than the processing order setting threshold value, the processing proceeds to Step ST26.

In Step ST24, the image pickup apparatus 20-2 carries out the position alignment in the space direction. The image pickup apparatus 20-2 carries out the position alignment in such a way that the duplication areas, for example, are ensured between the captured image PG-1 and the captured image PG-2 and the positions of the same object are aligned with each other, thereby enabling the images to be connected to each other. Then, the processing proceeds to Step ST25.

In Step ST25, the image pickup apparatus 20-2 carries out the image stabilization. The image pickup apparatus 20-2 carries out the control in such a way that a state after the position alignment in the space direction, for example, as depicted in (b) of FIG. 11, the positional relation between the captured image PG-1 and the captured image PG-2 for which the duplication areas AC can be ensured is held, and the image stabilization is carried out in the image pickup apparatuses 20-1 and 20-2. Then, the processing proceeds to Step ST27.

In Step ST26, the image pickup apparatus 20-2 carries out the image stabilization. The image pickup apparatus 20-2 carries out the control in such a way that, for example, the image stabilization is carried out in the image pickup apparatuses 20-1 and 20-2. Then, the processing proceeds to Step ST27.

In Step ST27, the image pickup apparatus 20-2 carries out the position alignment in the space direction. The image pickup apparatus 20-2 carries out the position alignment in such a way that the images of the same object overlap each other between the captured image PGc-1 and the captured image PGc-2 after the image stabilization. Then, the processing proceeds to Step ST28.

In Step ST28, the image pickup apparatus 20-2 produces the panoramic image. The image pickup apparatus 20-2 connects the images in the image production areas to each other which are extracted from the captured images PG-1 and PG-2 in such a way that the images of the same object are duplicated, thereby producing the panoramic image.

It should be noted that when a still image is produced as the panoramic image, the pieces of processing from Step ST21 to Step ST28 are executed in the flow chart depicted in FIG. 13. In addition, when a moving image or a monitor image is produced as the panoramic image, the pieces of processing from Step ST21 to Step ST28 are repetitively executed. Moreover, when the production of the panoramic image is carried out in the off-line, the pieces of processing from Step ST21 to Step ST27 may be executed, the images in the image production areas may be stored in the recording medium, and thereafter, the panoramic image of the still image or the moving image may be produced by using the images stored in the recording medium.

In such a manner, according to the second embodiment, when the amount of overlapping between the first captured image and the second captured image is small, the position alignment of the captured images is carried out between the image pickup apparatuses in such a way that the images can be connected to each other by aligning the positions of the same object with each other. After that, the state after the position alignment is held, and the image stabilization is carried out. Therefore, even when the amount of overlapping between the first captured image and the second captured image is small, the panoramic image can be produced.

4-2. Other Operation of Second Embodiment

Next, a description will be given with respect to an operation in the case where three or more image pickup apparatuses are used as other operation of the second embodiment.

Figure 14:
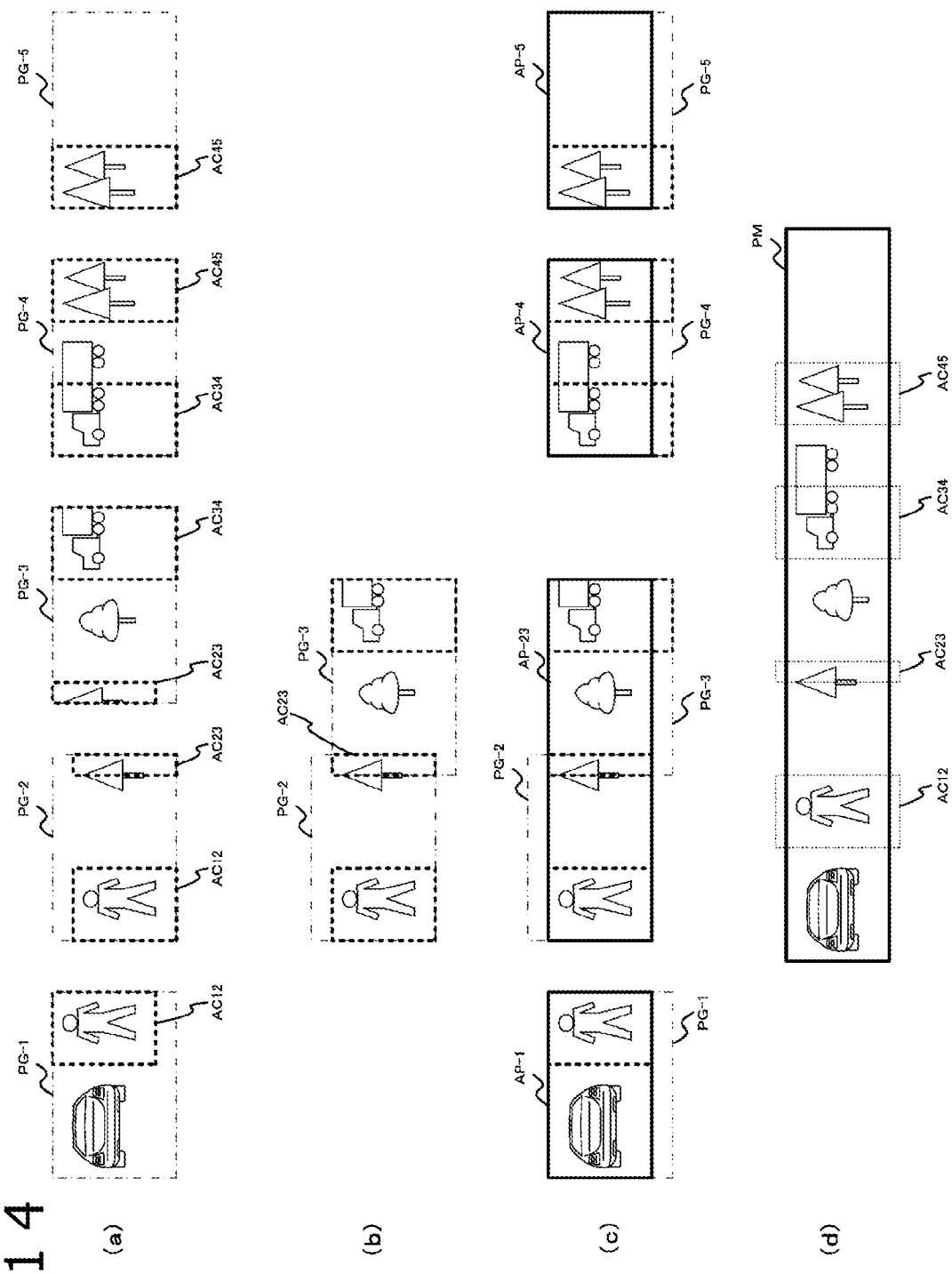
FIG. 14 is a view exemplifying an operation in the case where five image pickup apparatuses are used.

FIG. 14 exemplifies the operation in the case where five image pickup apparatuses are used. It is assumed that as depicted in (a) of FIG. 14, in captured images PG-1 to PG-5 which are produced by the five image pickup apparatuses, an amount of overlapping between the captured image PG-2 and the captured image PG-3 is equal to or smaller than a preset processing order setting threshold value, and an amount of overlapping among other captured images is larger than the processing order setting threshold value. It should be noted that duplication areas AC12, AC23, AC34, and AC45 represent areas in which the images of the same object overlap one another.

Here, when an amount of overlapping between some captured images becomes equal to or smaller than the processing order setting threshold value, the position alignment in the space direction is carried out between the captured images the amount of overlapping of which is equal to or smaller than the processing order setting threshold value, and thereafter, the image stabilization is carried out. Therefore, as depicted in (b) of FIG. 14, the position alignment in the space direction is carried out between the captured image PG2 and the captured image PG-3. After that, the image stabilization for the captured images is carried out.

(c) of FIG. 14 depicts image production areas AP-1, AP-4, and AP-5 after the image stabilization. In addition, the image production area of the captured images PG-2 and the captured image PG-3 for which the position alignment in the space direction is carried out corresponds to an area AP-23. In the production of the panoramic image, as depicted in (d) of FIG. 14, the images in the image production areas AP-1, AP-4, and AP-5 and the area AP-23 after the image stabilization are connected to one another in such a way that the images in the duplication areas AC12, AC23, AC34, and AC45 overlap one another. Therefore, the panoramic image thus produced becomes the image in which the positions of the object are aligned to be connected to one another.

In such a way, according to other operation of the second embodiment, even when three or more image pickup apparatuses are provided, and thus there is caused the case where an amount of overlapping between images is equal to smaller than the processing order setting threshold value, the panoramic image can be produced.

5. Third Embodiment

For a plurality of image pickup apparatuses, a period of dominant shake differs depending on what kind of moving body the plurality of image pickup apparatuses are provided in. For example, a period of the shake differs between the case where a plurality of image pickup apparatuses are mounted to a vehicle such as a bicycle or an automobile, and the case where a human being carries the plurality of image pickup apparatuses. Thus, a change in positional relation among the captured images in the time direction differs in response to the period of the shake. In addition, for a plurality of image pickup apparatuses, the magnitude and direction of the shake differ among the image pickup apparatuses depending on in what state, to which of the mounting positions, and to what kind of moving body the image pickup apparatuses are mounted in some cases. Thus, a change in positional relation in the space direction among the captured images produced by a plurality of image pickup apparatuses differs depending on a difference in magnitude and direction of the shake.

In addition, if in the production of the panoramic image, the positional relation in the time direction among the captured images and the positional relation in the space direction among the captured images produced by a plurality of image pickup apparatuses are constant, then, the images to be used in the production of the panoramic image can be readily acquired from the captured images. However, when the positional relation among the captured images is changed, the images to be used in the production of the panoramic image must be acquired from the captured images on the basis of the change in positional relation.

Against the change in positional relation in the time direction among the captured images, the positional relation in the time direction among the captured images can be held approximately constant by carrying out the image stabilization. In addition, for holding constant the positional relation in the space direction among the captured images which are produced in a plurality of image pickup apparatuses, it is only necessary to carry out the position alignment in the space direction among the images. However, if the position alignment in the space direction among the images is carried out every frame irrespective of the presence or absence of the change in positional relation in the space direction, then, the calculation cost for the position alignment increases. Then, in the third embodiment, the frequency of the position alignment in the space direction among the captured images is controlled in response to the degree of the change in positional relation among the captured images.

5-1. Operation of Third Embodiment

Figure 15:
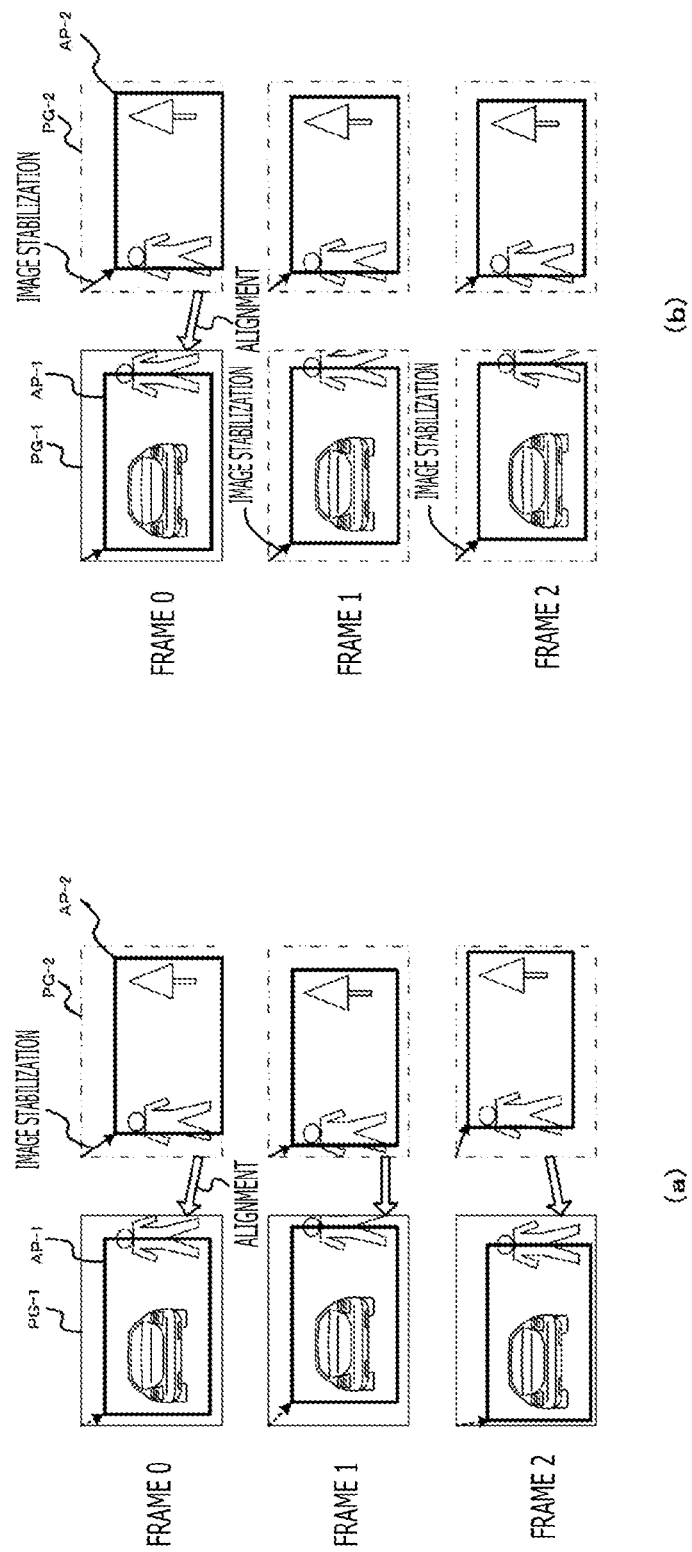
FIG. 15 is a view explaining an operation for controlling frequency of position alignment in a space direction in response to a degree of a change in positional relation.

FIG. 15 is a view explaining an operation for controlling the frequency of the position alignment in the space direction in response to the degree of the change in the positional relation between the image pickup apparatuses. In this operation, for example, the captured image PG-1 and the shake information are supplied from the image pickup apparatus 20-1 to the image pickup apparatus 20-2. In addition, the image pickup apparatus 20-2 sets the image production area AP-2 after the image stabilization on the basis of the shake information. Further, the image pickup apparatus 20-2 carries out the setting of the image production area AP-1 after the image stabilization on the basis of the position adjustment vector acquired by carrying out the position alignment in the space direction through which the positions of the object are aligned with each other by using the image production area AP-2 in the captured image PG-2 and the captured image PG-1 acquired from the image pickup apparatus 20-1. Alternatively, the image pickup apparatus 20-2 carries out the setting of the image production area AP-1 after the image stabilization on the basis of the position adjustment vector and the shake information. Moreover, the image pickup apparatus 20-2 produces the panoramic image by using the image in the image production area AP-1 and the image in the image production area AP-2. Incidentally, in FIG. 15, and FIGS. 18 and 19 which will be described later, a frame, of the captured image PG-1, in which the image production area AP-1 after the image stabilization is set on the basis of the calculation of the position adjustment vector and the position adjustment vector thus calculated is depicted in the form of a thin line frame. A frame, of the captured image PG-1, in which the image production area AP-1 after the image stabilization is set on the basis of the position adjustment vector and the shake information is depicted in the form of a broken line frame.

(a) of FIG. 15 depicts the operation in the case where the degree of the change in positional relation between the captured images (image pickup apparatuses) is large. (b) of FIG. 15 depicts the operation in the case where the degree of the change in positional relation between the captured images (image pickup apparatuses) is small. The degree of the change in positional relation between the captured images (image pickup apparatuses) is determined as follows. That is to say, it is judged for a predetermined time period whether or not the change in positional relation between the captured image PG-1 and the captured image PG-2 which change is generated by a difference in magnitude or direction of the shake between the image pickup apparatus 20-1 and the image pickup apparatus 20-2 exceeds a change judgment threshold value on the basis of the shake information of the image pickup apparatus 20-1 and the shake information of the image pickup apparatus 20-2. Thus, a rate of the number of frames in each of which an amount of change exceeds the change judgment threshold value is determined as the degree of the change.

When the degree of the change in positional relation between the captured images (image pickup apparatuses) is large, the image pickup apparatus 20-2 increases the frequency of the position alignment in the space direction. For example, when as depicted in (a) of FIG. 15, the positional relation between the image pickup apparatuses, that is, the positional relation between the captured image PG-1 and the captured image PG-2 is largely changed every frame, the image pickup apparatus 20-2 carries out the image stabilization every frame for the image production area AP-2. That is to say, the image pickup apparatus 20-2 carries out the position alignment in the time direction for the image production area AP-2.

Figure 16:
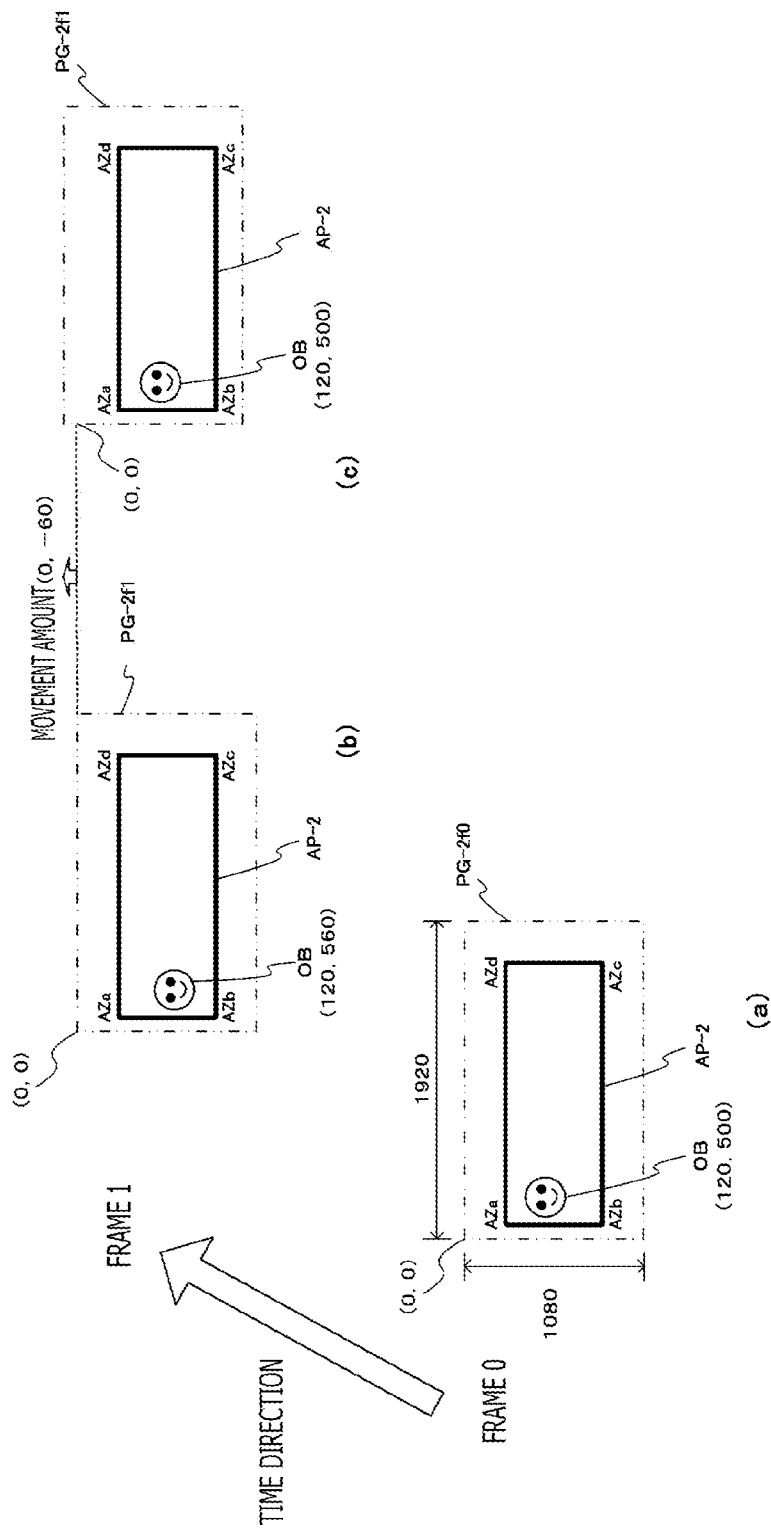
FIG. 16 is a view explaining position alignment in a time direction.

FIG. 16 is a view explaining the position alignment in the time direction. Incidentally, in FIG. 16, the size of the captured image PG-2 is set as 1920 pixels×1080 pixels. In addition, it is assumed that the coordinate origin of the captured image PG-2 is located in the top left position. It is also assumed that the object OB is in the coordinate position (120, 500) in the captured image PG-2/0 of the frame 0 depicted in (a) of FIG. 16, and is in the coordinate position (120, 560) in the captured image PG-2/1 of the frame 1 depicted in (b) of FIG. 16. Moreover, it is assumed that the coordinate positions of the four corners of the image production area AP-2 are the coordinate positions AZa, AZb, AZc, and AZd containing the object OB in the frame 0. Here, when the captured image PG-2/1 of the frame 1 is moved so that the position of the object is made to agree with the captured image PG-2/0 of the frame 0, if as depicted in (c) of FIG. 16, an amount of movement of the captured image PG-2/1 is an amount of movement (0, −60), then, the position of the object OB in the image production area AP-2 in the captured image PG-2/1 agrees with the position of the object OB in the image production area AP-2 in the captured image PG-2/0. That is to say, the position alignment in the time direction can be carried out. It should be noted that in FIG. 15, and FIGS. 18 and 19 which will be described later, a vector indicating the image production area after the image stabilization with the captured image PG as a reference is exemplified as the image stabilization vector for correction of the shake generated in the captured image.

In addition, the image pickup apparatus 20-2 carries out the position alignment in the space direction between the image production area AP-2 and the captured image PG-1 every frame, and sets the image production area AP-1 every frame. When the position alignment in the space direction is carried out every frame, the image pickup apparatus 20-2 sets the image production area AP-1 in such a way that the image production area AP-2 and the position of the object after the image stabilization agree with each other by using the position adjustment vector acquired by the position alignment in the space direction.

When the degree of the change in positional relation between the captured images (image pickup apparatuses) is small, a change from a state in which the duplication area, for example, is secured by a predetermined amount between the image in the image production area AP-1 and the image in the image production area AP-2 to other state is small. Therefore, even if the frequency of the position alignment in the space direction is reduced, the state in which the duplication area is secured is maintained. Therefore, when, for example, as depicted in (b) of FIG. 15, the change in positional relation between the captured image PG-1 and the captured image PG-2 is small, the image pickup apparatus 20-2 carries out the image stabilization every frame, that is, the position alignment in the time direction for the image production area AP-2. In addition, the image pickup apparatus 20-2 carries out the position alignment in the space direction between the image production area AP-2 and the captured image PG-1 at the intervals of a plurality of frames, and holds the last position adjustment vector for a time period for which no position alignment is carried out. Moreover, the image pickup apparatus 20-2 sets the image production area AP-1 in such a way that the image production area AP-2 and the object after the image stabilization agree in position with each other in the frame in which the position alignment in the space direction is carried out by using the position adjustment vector acquired through the position alignment in the space direction. In addition, the image pickup apparatus 20-2 carries out the position alignment in the time direction in such a way that no shake is generated for the last image production area AP-1 which is set by carrying out the position alignment in the space direction in the frame in which no position alignment in the space direction is carried out.

Figure 17:
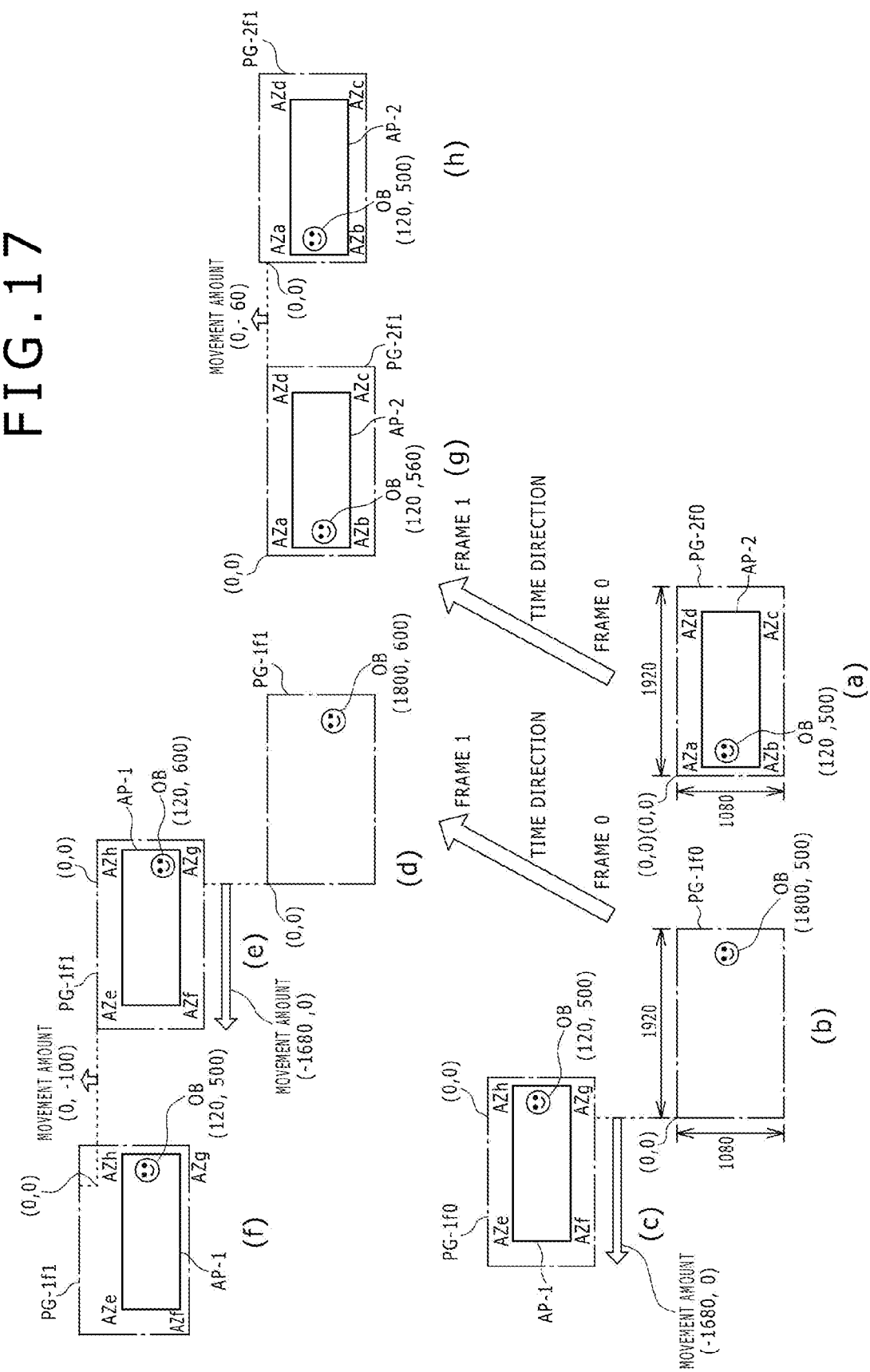
FIG. 17 is a view explaining position alignment in a time direction about a frame for which no position alignment in a space direction is carried out.

FIG. 17 is a view explaining the position alignment, in the time direction, about the frame in which no position alignment in the space direction is carried out. Incidentally, in FIG. 17, each of the sizes of the captured images PG-1 and PG-2 is set as 1920 pixels×1080 pixels. In addition, it is assumed that the coordinate origin of the captured images PG-1/0, PG-1/1, and PG-2/0 is located at the top left position. It is also assumed that in the frame 0, the object OB is located in the coordinate position (120, 500) in the captured image PG-2/0 depicted in (a) of FIG. 17, and located in the coordinate position (1800, 500) in the captured image PG-1/0 depicted in (b) of FIG. 17. In this case, as described with reference to FIG. 6, the captured image PG-1/0 is moved by an amount of movement (−1680, 0) as depicted in (c) of FIG. 17, thereby enabling the position alignment in the space direction between the captured images PG-1/0 and PG-2/0 to be carried out. Incidentally, in the image production area AP-2, the coordinate positions of the four corners AZa, AZb, AZc, and AZd are set so as to contain the object OB. In the image production area AP-1, the coordinate positions of the four corners AZe, AZf, AZg, and AZh are set in such a way that the positions of the object OB are made to agree with each other to connect the image in the image production area AP-1 to the image in the image production area AP-2, thereby enabling the panoramic image to be produced. It should be noted that the coordinate positions AZa to AZh are the positions with the coordinate position (0, 0) as the reference.

Next, it is assumed that in the captured image PG-1/1 in the frame 1 depicted in (d) of FIG. 17, the object OB is shifted to the coordinate position (120, 600) by the shake of the image pickup apparatus 20-1. In this case, even when as depicted in (e) of FIG. 17, the captured image PG-1/1 in the frame 1 is moved to the position where in the frame 0, the position alignment in the space direction is carried out, the position of the object OB of the captured image PG-1/0, and the position of the object OB of the captured image PG-1/1 do not agree with each other. Therefore, in the frame 1 in which no position alignment in the space direction is carried out, the position alignment in the time direction between the captured image PG-1/0 and the captured image PG-1/1 after the position alignment in the space direction is carried out. Here, when as depicted in (f) of FIG. 17, an amount of movement of the captured image PG-1/1 from the position after the position alignment in the space direction in the frame 0 is an amount of movement of (0, −100), the position of the object OB in the image production area AP-1 in the captured image PG-1/1 and the position of the object OB in the image production area AP-1 in the captured image PG-1/0 agree with each other. That is to say, the position alignment in the time direction can be carried out. Therefore, in the frame 1, the image for which the image stabilization is carried out is obtained by using the image in the image production area AP-1 in the captured image PG-1/1 in which the position alignment in the time direction is carried out for the frame 0.

In addition, in the frame 1, in the captured image PG2/1, as depicted in (h) of FIG. 17, the position alignment in the time direction is carried out. Therefore, the position of the object OB in the image production area AP-1 in the captured image PG-1/1 of the frame 1 depicted in (f) of FIG. 17, and the position of the object OB in the image production area AP-2 in the captured image PG-2/1 of the frame 1 depicted in (h) of FIG. 17 can be made to agree with those in the case of the frame 0. That is to say, the image production area AP-1 and the image production area AP-2 can be set in such a way that the shake is not caused, and the positions of the object agree with each other.

When the degree of the change in positional relation between the captured images (image pickup apparatuses) is small, the image pickup apparatus 20-2 executes such processing, whereby even if the frequency of the position alignment in the space direction is reduced, the state in which the duplication area is ensured can be maintained. In addition, the calculation cost and the data amount for the position alignment in the space direction can be reduced.

Figure 18:
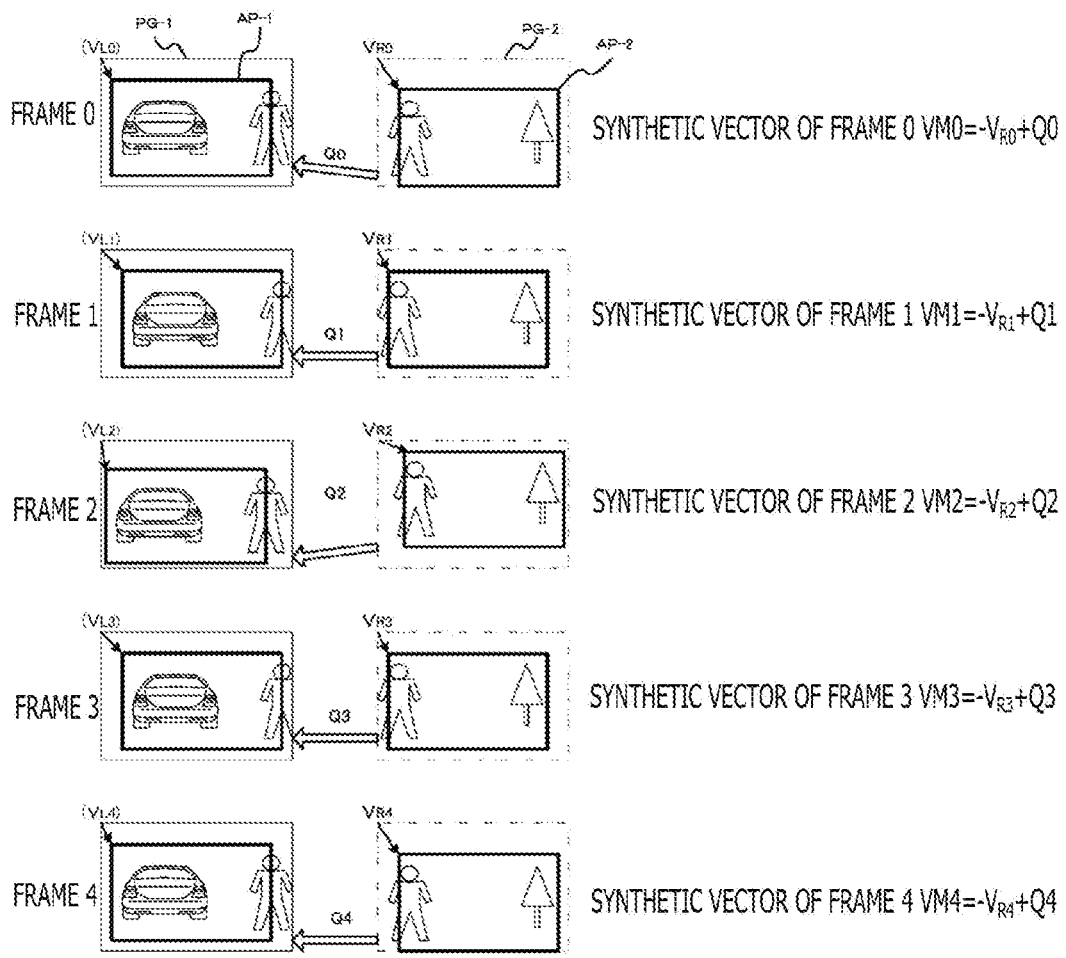
FIG. 18 is a view exemplifying an operation in the case where position alignment in a space direction is carried out every frame.
Figure 19:
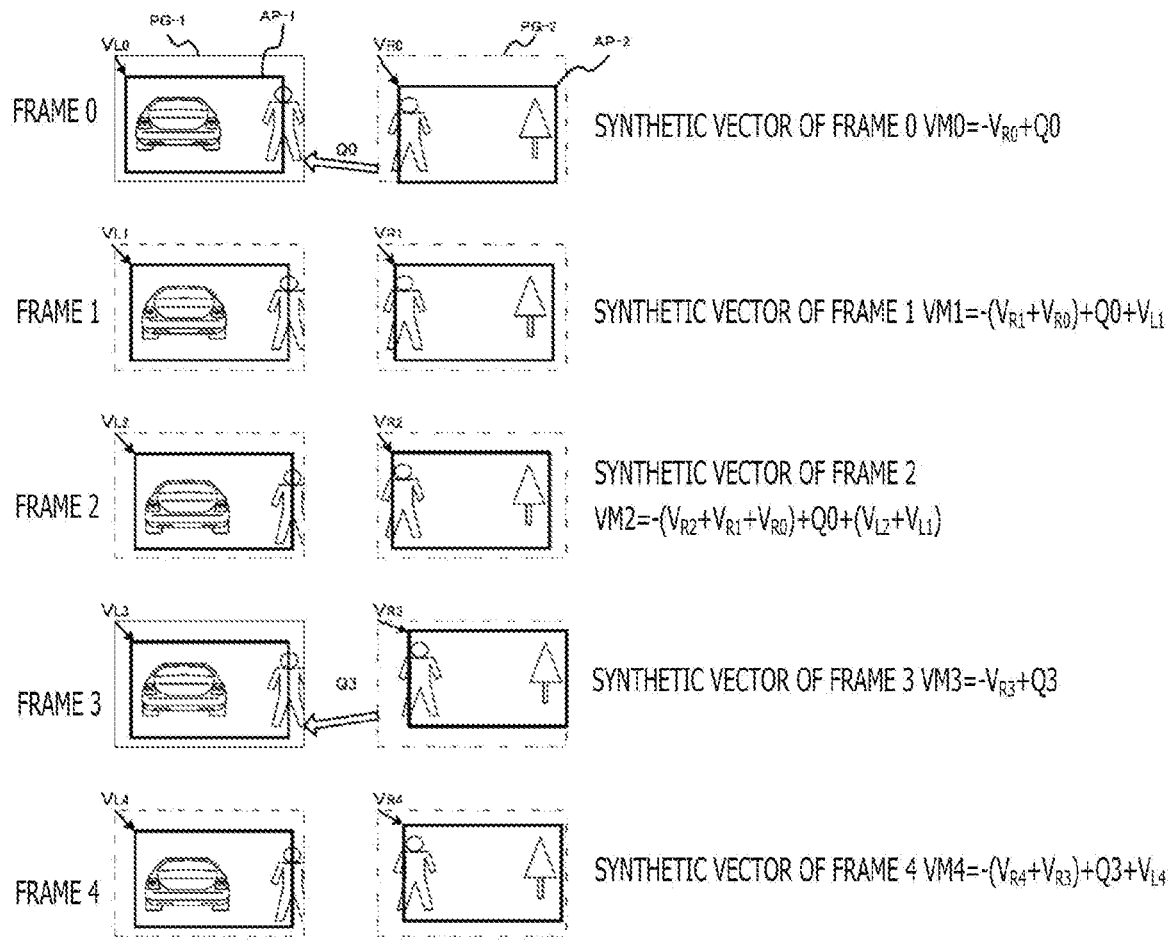
FIG. 19 is a view exemplifying an operation in the case where position alignment in the space direction is carried out at intervals of a plurality of frames.

FIG. 18 exemplifies the operation in the case where the position alignment in the space direction is carried out every frame. FIG. 19 exemplifies the operation in the case where the position alignment in the space direction is carried out at the intervals of a plurality of frames. Incidentally, when the position alignment in the space direction is carried out in the image pickup apparatus 20-2, the image pickup apparatus 20-2 acquires the captured image PG-1 produced in the image pickup apparatus 20-1, and the shake information indicating the shake state of the image pickup apparatus 20-1. In addition, the image pickup apparatus 20-2 executes processing for aligning the position of the image produced in the image pickup apparatus 20-1 with the image production area AP-2 after the image stabilization. In addition, in the position alignment in the space direction between the images, as described above, the position adjustment vector is calculated by using he captured images PG-1 and PG-2.

In the frame 0 of FIG. 18, the vector for correcting the shake generated in the captured image PG-2 is set as an image stabilization vector VR0. In addition, for making the image in the image production area AP-1 to be connected to the image production area AP-2 continuous with the image in the image production area AP-2, the vector with which the positions of the object agree with each other is set as a position adjustment vector Q0. In this case, the image production area AP-2 can be set in such a way that the shake is prevented from being generated by using the image stabilization vector VR0. In addition, the image production area AP-1 to be connected to the image production area AP-2 can be set by using the position adjustment vector Q0. That is to say, even when the image stabilization vector VL0 is not used, a synthetic vector VM0 which is calculated by using the image stabilization vector VR0 and the position adjustment vector Q0 is used as depicted in FIG. 18, thereby enabling the image production area AP-1 to be set in such a way that the shake is prevented from being generated and the positions of the object agree with each other. It should be noted that when the image production areas AP-1 and AP-2 are connected to each other by, for example, using an alpha blending technique or the like, the image production area AP-1 is set so as to have the overlapping area in which the object in the image production area AP-1 and the object in the image production area AP-2 agree with each other.

Next, in the frame 1, a vector for correcting the shake generated between the frame 0 and the frame 1 in the captured image PG-2 is set as an image stabilization vector VR1. In addition, a vector for making the image in the image production area AP-1 to be connected to the image production area AP-2 continuous with the image in the image production area AP-2 is set as a position adjustment vector Q1. In this case, similarly to the case of the frame 0, even when the image stabilization vector VL1 is not used, a synthetic vector VM1 which is calculated by using the image stabilization vector VR1 and the position adjustment vector Q1 is used, whereby the image production area AP-1 can be set in such a way that the shake is prevented from being generated between the frame 0 and the frame 1 of the captured image PG-1, and the position alignment of the object can be carried out in the connection portion between the image production area AP-1 and the image production area AP-2. In addition, in the frame 2 to the frame 4 as well, similarly to the case of the frames 0 and 1, the image production area AP-1 can be set in such a way that the shake is prevented from being generated and the position alignment of the object can be carried out.

In the frame 0 of FIG. 19, a vector for correcting the shake generated in the captured image PG-2 is set as an image stabilization vector VR0. In addition, a vector for making the image in the image production area AP-1 to be connected to the image production area AP-2 continuous with the image in the image production area AP-2 is set as a position adjustment vector Q0. In this case, the image production area AP-2 can be set in such a way that the shake is prevented from being generated by using the image stabilization vector VR0. In addition, the image production area AP-1 to be connected to the image production area AP-2 can be set by using the position adjustment vector Q0. That is to say, a synthetic vector which is calculated by using the image stabilization vector VR0 and the position adjustment vector Q0 is used, thereby enabling the image production area AP-1 to be set in such a way that the shake is prevented from being generated and the positions of the object agree with each other. For example, when the frame 0 represents that in the first image, each of the image stabilization vectors VL0 and VR0 is (0, 0), and the positions of the object OB are (a) and (b) of FIG. 17, a synthetic vector VM0 with which the image production area AP-1 is set in such a way that the shake is prevented from being generated and the position of the object agrees with the image in the image production area AP-2 is expressed by Expression (1). It should be noted that in FIG. 17, the image stabilization vector VR0 is (0, 0), and the position adjustment vector Q0 is (−1680, 0).

$$VM0 = -VR0 + Q0$$

$$= -(0,0) + (-1680,0)$$

$$= (-1680,0) \qquad (1)$$

Next, in the frame 1, a vector for correcting the shake generated in the captured image PG-2 is set as an image stabilization vector VR1. On the other hand, in the frame 1, a vector for correcting the shake generated in the captured image PG-1 is set as an image stabilization vector VL1. In addition, in the frame 1, no position adjustment vector is calculated. Therefore, the image stabilization vector in the captured image PG-1 is calculated in the frame 0, as the nearest frame in which the position adjustment vector is calculated, as the reference. Here, the image stabilization vector VR1 for correcting the shake generated in the captured image PG-1 is the vector with the frame 0 as the reference. In addition, the image production area AP-1 set in the frame 0 corresponds to the position where the image stabilization is carried out with the image stabilization vector VL0. Therefore, in the frame 1, the position of the image production area AP-1 which is set in such a way that the shake is prevented from being generated and the positions of the object agree with each other becomes the position where the image production area AP-1 of the frame 0 is moved by VL1 (the image pickup apparatus 20-1 is relatively moved between the frame 0 and the frame 1 through the image stabilization by this amount of movement). That is to say, the synthetic vector calculated by using the image stabilization vectors VR0 and VR1, the position adjustment vector Q0, and the image stabilization vector VL1 is used, whereby the image production area AP-1 can be set in such a way that the shake is prevented from being generated, and the positions of the object agree with each other.

For example, in the case of FIG. 17 described above, for the captured image PG-2/1 of the frame 1 depicted in (g) of FIG. 17, as depicted in (h) of FIG. 17, the position alignment in the time direction is carried out. In addition, for the captured image PG-1/1 of the frame 1 depicted in (d) of FIG. 17, from the position for the position alignment in the space direction of the frame 0, as depicted in (f) of FIG. 17, the position alignment in the time direction is carried out. If the position alignment is carried out in such a way, then, the image production area AP-1 can be set in such a way that the shake is prevented from being generated and the position of the object in the image production area AP-1 agrees with the position of the object in the image production area AP-2. Here, the captured image PG-1/1 depicted in (f) of FIG. 17 is located in the position obtained through the movement by the synthetic vector VM1 with respect to the captured image PG-2/1 in (h) of FIG. 17. The synthetic vector VM1 has a value of Expression (2). It should be noted that the position adjustment vector Q0 depicted in FIG. 19 is (−1680, 0) in the case of FIG. 17. In addition, with regard to the image stabilization vectors VR1 and VL1 depicted in FIG. 19, in the case of FIG. 17, the image stabilization vector VR1 is (0, 60), and the image stabilization vector VL1 is (0, 100).

$$VM1 = -(VR1 + VR0) + Q0 + VL1 \qquad (2)$$

$$= -((0, 60) + (0, 0)) + (-1680, 0) + (0, 100)$$

$$= (-1680, 40)$$

Therefore, if the position obtained through the movement by the synthetic vector VM1 with respect to the captured image PG-2/1 of the frame 1 is set as the position of the captured image PG-1/1, then, the image production area AP-1 can be set in such a way that the shake is prevented from being generated and the positions of the object agree with each other. That is to say, the images in the image production area AP-1 and the image production area AP-2 become the images in which the correction is carried out so as to prevent the shake from being generated and the positions of the object agree with each other.

In addition, in the frame 2, a vector for correcting the shake generated in the captured image PG-2 is set as an image stabilization vector VR2. The correction vector VL2 is the vector with the frame 1 as the reference. On the other hand, in the frame 2, a vector for correcting the shake generated in the captured image PG-1 is set as an image stabilization vector VL2. In addition, in the frame 2, no position adjustment vector is calculated. Therefore, the image stabilization vector in the captured image PG-1 is calculated using the nearest frame in which the position adjustment vector is calculated as the reference. Here, the image stabilization vector VL2 for correcting the shake generated in the captured image PG-1 is the vector with the frame 1 as the reference. In addition, the image production area AP-1 set in the frame 1 corresponds to the position where the image stabilization is carried out with the image stabilization vector VL1. Therefore, in the frame 2, the position of the image production area AP-1 which is set in such a way that the shake is prevented from being generated and the positions of the object agree with each other becomes the position where the image production area AP-1 of the frame 0 is moved by (VL2+VL1). Likewise, the image production area AP2 of the frame 2 is located in the position obtained through the movement of the image production area AP2 of the frame 0 by (VR2+VR1). That is to say, the synthetic vector VM2 obtained by carrying out the arithmetic operation of Expression (3) by using the image stabilization vectors VR0, VR1, and VR2, the position adjustment vector Q0, and the image stabilization vectors VL1 and VL2 is used, thereby enabling the image production area AP-1 to be set in such a way that the shake is prevented from being generated and the positions of the object agree with each other.

$$VM2=-(VR2+VR1+VR0)+Q0+(VL2+VL1) \quad (3)$$

In the frame 3, a vector for correcting the shake generated in the captured image PG-2 is set as an image stabilization vector VR3. In addition, a vector for making the image in the image production area AP-1 to be connected to the image production area AP-2 continuous with the image in the image production area AP-2 is set as a position adjustment vector Q3. In this case, the image production area AP-2 can be set in such a way that the shake is prevented from being generated by using the image stabilization vector VR3. Thus, by using the position adjustment vector Q3, the image production area AP-1 to be connected to the image production area AP-2 can be set. That is to say, as indicated in Expression (4), by using the synthetic vector VM3 calculated by using the image stabilization vector VR3 and the position adjustment vector Q3, the image production area AP-1 can be set in such a way that the shake is prevented from being generated and the positions of the object agree with each other.

$$VM3=-VR3+Q3 \quad (4)$$

In addition, in the frame 4, the processing similar to that in the case of the frame 1 is executed with the frame 3, as the nearest frame in which the calculation of the position adjustment vector is carried out, as the reference. That is to say, by using a synthetic vector VM4 indicated in Expression (5), the image production area AP-1 can be set in such a way that the shake is prevented from being generated, and the positions of the object agree with each other.

$$VM4=-(VR4+VR3)+Q3+VL4 \quad (5)$$

In such a way, by carrying out the position alignment in the space direction at the intervals of a plurality of frames, for example, even if the error generated by the position alignment in the time direction of the frame in which no position alignment in the space direction is carried out is accumulated with a lapse of time, the errors accumulated by the position alignment in the space direction can be reset. Therefore, it is possible to prevent the shift or the like of the image overlapping due to the accumulation of the error from being generated.

Figure 20:
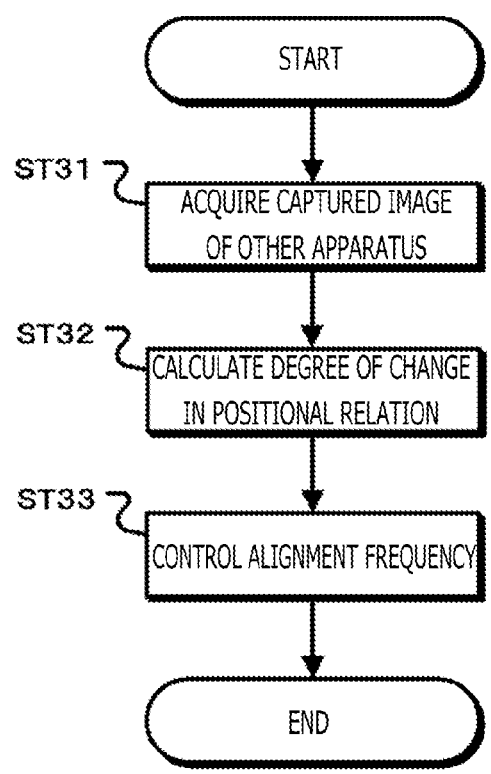
FIG. 20 is a flow chart depicting an operation of a third embodiment.

FIG. 20 is a flow chart depicting the operation of the third embodiment. In Step ST31, the image pickup apparatus 20-2 acquires the captured image from the other apparatus. The image pickup apparatus 20-2, for example, acquires the captured image PG-1, in the image capturing area AR-1, produced in the image pickup apparatus 20-1, and the processing proceeds to Step ST32.

In Step ST32, the image pickup apparatus 20-2 calculates the degree of the change in positional relation. The image pickup apparatus 20-2 carries out the spatial positional alignment in such a way that in the captured image PG-2 produced and the captured image PG-1 acquired from the image pickup apparatus 20-1, the images of the same object overlap each other. In addition, the image pickup apparatus 20-2 judges whether or not an amount of change in positional relation between the captured image PG-2 produced and the captured image PG-1 acquired from the image pickup apparatus 20-1 exceeds the change judgment threshold value with respect to the images for M (positive integral number) frames. Then, a rate of the number of frames in each of which the amount of change exceeds the change judgment threshold value is set as the degree of the change. Moreover, the image pickup apparatus 20-2 calculates the degree of the change in positional relation at the intervals of N (positive integral number) frames. The image pickup apparatus 20-2 calculates the degree of the change in positional relation in such a manner, and the processing proceeds to Step ST33.

In Step ST33, the image pickup apparatus 20-2 controls the frequency of the position alignment. The image pickup apparatus 20-2 increases the frequency of carrying out the position alignment when the degree of the change in positional relation is large, and reduces the frequency of carrying out the position alignment when the degree of the change in positional relation is small.

In such a manner, according to the third embodiment, the frequency of the position alignment in the space direction between the images to be synthesized in the production of the panoramic image is controlled in response to the degree of the change in positional relation of the captured images between the image pickup apparatuses. Therefore, the state in which the position alignment of the object can be carried out to connect the images to each other can be efficiently held.

5-2. Other Operation of Third Embodiment

The degree of the change in positional relation described above is by no means limited to the case where it is carried out with the observation time period and the observation interval being fixed, and the observation time period and the observation interval may be adjusted in response to the degree of the change in positional relation. In other operation of the third embodiment, a description will be given with respect to an operation for adjusting the observation time period and the observation interval in response to the degree of the change in positional relation.

Figure 21:
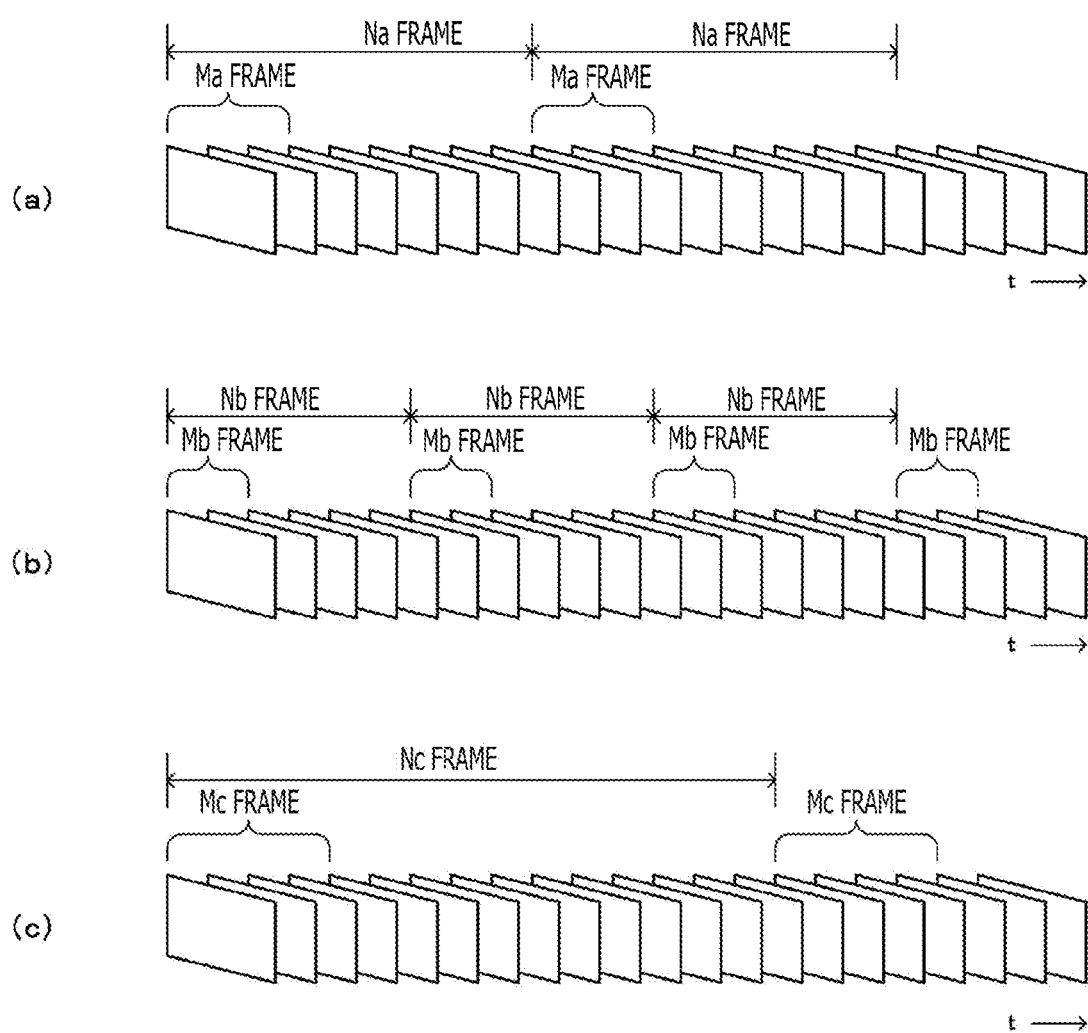
FIG. 21 is a view depicting an operation for calculating a degree of a change in positional relation.

FIG. 21 is a view depicting an operation for calculating the degree of the change in positional relation. For example, at the time of start of the operation, as depicted in (a) of FIG. 21, the observation time period of the degree of the change is set as Ma (positive integral number) frames, and the observation interval of the degree of the change is set as Na (positive integral number) frames. After start of the operation, when the degree of the change in positional relation is large, at least one of the observation time period and the observation interval of the degree of the change is shortened. (b) of FIG. 21 exemplifies the case where when the degree of the change in positional relation is large, the observation time period and the observation interval of the degree of the change are both shortened. It should be noted that in the observation time period, "Mb<Ma" is established, and in the observation interval, "Nb<Na" is established. In addition, after start of the operation, when the degree of the change in positional relation is small, at least one of the observation time period and the observation interval of the degree of the change is lengthened. (c) of FIG. 21 exemplifies the case where when the degree of the change in positional relation is small, the observation time period and the observation interval are both lengthened. It should be noted that in the observation time period, "Mc>Ma" is established and in the observation interval, "Nc>Na" is established. The observation time period or the observation interval may be shortened every one frame as the degree of the change, for example, is larger, and is lengthened every one frame as the degree of the change is smaller.

Figure 22:
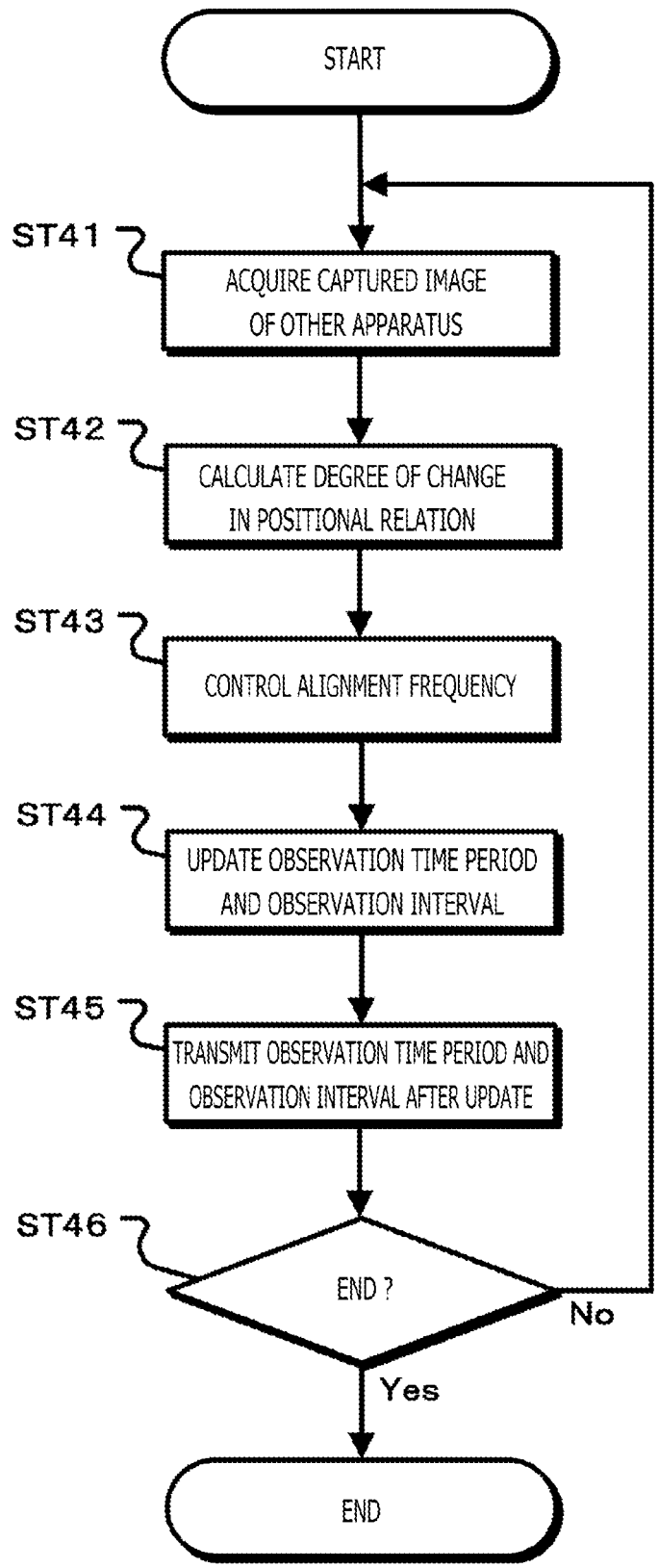
FIG. 22 is a flow chart depicting other operation of the third embodiment.

FIG. 22 is a flow chart depicting other operation of the third embodiment. In Step ST41, the image pickup apparatus 20-2 acquires the captured image from the other apparatus. The image pickup apparatus 20-2, for example, acquires the captured image PG-1, in the image capturing area AR-1, produced in the image pickup apparatus 20-1. Then, the processing proceeds to Step ST42.

In Step ST42, the image pickup apparatus 20-2 calculates the degree of the change in positional relation. The image pickup apparatus 20-2 carries out the spatial position alignment in such a way that in the captured image PG-2 produced and the captured image PG-1 acquired from the image pickup apparatus 20-1, the images of the same object overlap each other. In addition, the image pickup apparatus 20-2 judges whether or not an amount of change in positional relation between the captured image PG-2 produced and the captured image PG-1 acquired from the image pickup apparatus 20-1 exceeds the change judgment threshold value, for example, with respect to the images for the observation time period. Then, a rate of the number of frames in each of which the amount of change exceeds the change judgment threshold value is set as the degree of the change. In addition, the image pickup apparatus 20-2 calculates the degree of the change in positional relation at the intervals of N frames. The image pickup apparatus 20-2 calculates the degree of the change in positional relation in this manner, and the processing proceeds to Step ST43.

In Step ST43, the image pickup apparatus 20-2 controls the frequency of the position alignment. The image pickup apparatus 20-2 increases the frequency of carrying out the position alignment when the degree of the change in positional relation is large, and reduces the frequency of carrying out the position alignment when the degree of the change in positional relation is small. Then, the processing proceeds to Step ST44.

In Step ST44, the image pickup apparatus 20-2 updates the observation time period and the observation interval. The image pickup apparatus 20-2 carries out the adjustment in such a way that as the degree of the change in positional relation is larger, at least one of the observation time period and the observation interval is shortened. In addition, the image pickup apparatus 20-2 carries out the adjustment in such a way that as the degree of the change in positional relation is smaller, at least one of the observation time period and the observation interval is lengthened. The image pickup apparatus 20-2 updates the setting in such a way that for the observation time period and the observation interval after the adjustment, the degree of the change in positional relation is calculated. Then, the processing proceeds to Step ST45.

In Step ST45, the image pickup apparatus 20-2 transmits the observation time period and the observation interval after the update. The image pickup apparatus 20-2 transmits the observation time period and the observation interval after the update to the image pickup apparatus 20-1. Then, the processing proceeds to Step ST46.

In Step ST46, the image pickup apparatus 20-2 judges whether or not the image capturing is ended. When it is judged that the image capturing is not yet ended, or when it is judged that the processing for all the frames is not yet completed, the processing in the image pickup apparatus 20-2 returns back to Step ST41. When the image capturing is ended or the processing for all the frames is completed, the processing is ended.

In such a manner, according to other operation of the third embodiment, the observation time period and the observation interval for the degree of the change are adjusted in response to the degree of the change in positional relation. Therefore, as compared with the case where the observation time period and the observation interval are fixed, the optimum control operation can be carried out in response to the degree of the change in positional relation. It should be noted that although in other operation of the third embodiment, the case where the observation time period and the observation interval are adjusted, alternatively, only one of the observation time period and the observation interval may be adjusted.

6. Fourth Embodiment

In the case where the panoramic image is produced by using the captured images produced in a plurality of image pickup apparatuses, if the image quality is deteriorated in response to the shake and the plurality of image pickup apparatuses are different in amount of shake from one another, then, it is feared that the captured images used in the production of the panoramic image become the images in which the image quality difference is caused. Therefore, in the fourth embodiment, a description will be given with respect to the case where the image processing is executed in such a way that the image quality difference is inconspicuous at the time of production of the panoramic image.

6-1. Operation of Fourth Embodiment

Figure 23:
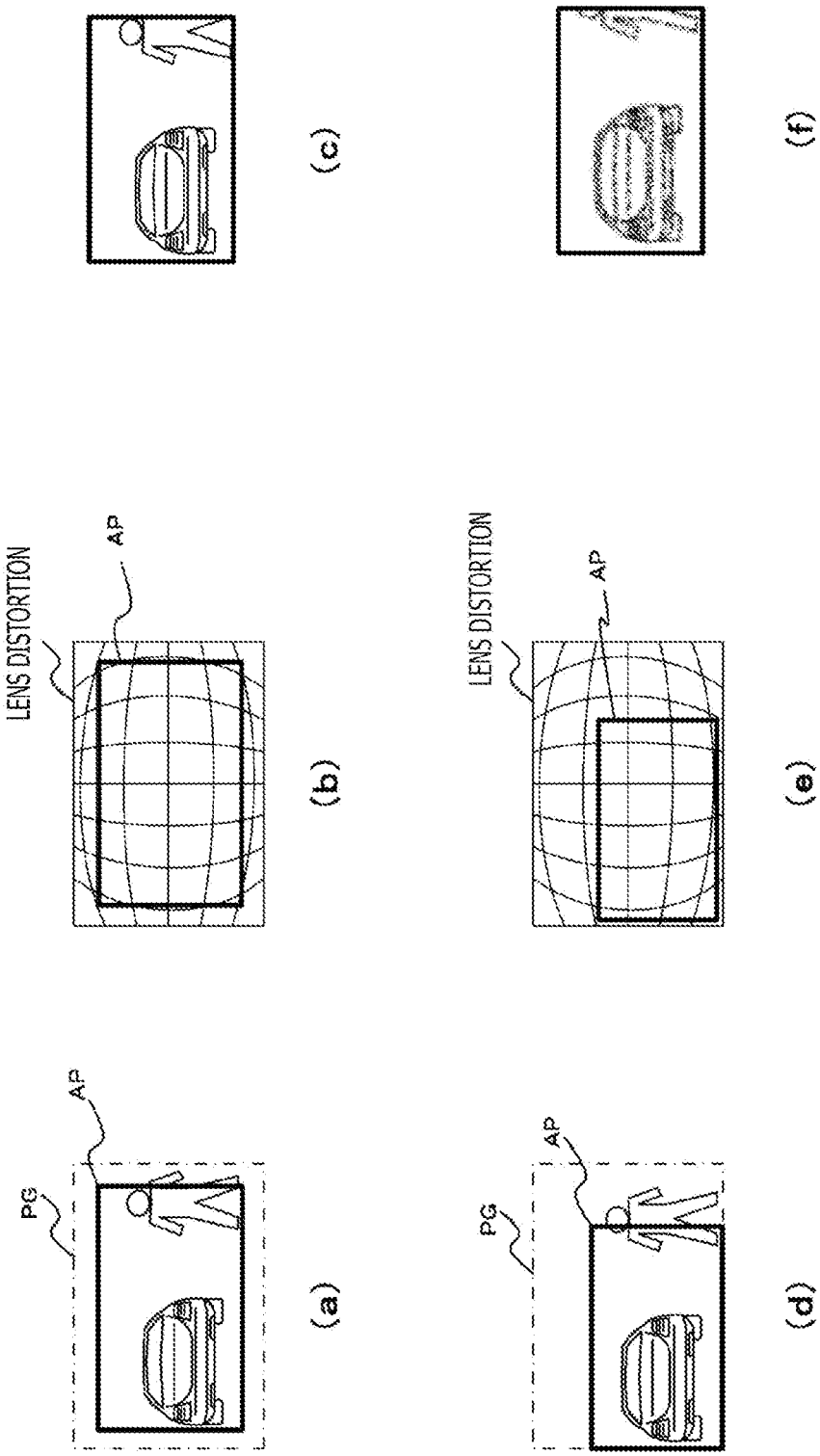
FIG. 23 is a view explaining a relation between magnitude of shake, and image quality of an image used in production of a panoramic image.

FIG. 23 is a view depicting a relation between the magnitude of the shake and the image quality of the images used in the production of the panoramic image.

The image pickup apparatus 20-2 calculates an amount of shake on the basis of either the captured images, for example, for each frame produced in the respective image pickup apparatuses or the sensor signals produced in the sensor portions 211 of the respective image pickup apparatuses. Here, when an amount of shake is small, as depicted in (a) of FIG. 23, the image production area AP can be widened with respect to the captured image PG. In addition, as depicted in (b) of FIG. 23, a central portion in which the lens distortion is small can be segmented. Therefore, when an amount of shake is small, in the image in the image production area AP used in the production of the panoramic image, as depicted in (c) of FIG. 23, the image quality can be satisfactorily held.

When an amount of shake is large, as depicted in (d) of FIG. 23, the image production area AP needs to be narrowed with respect to the captured image PG. In addition, as depicted in (e) of FIG. 23, there occurs the case where a portion in which the lens distortion is large must be segmented. Therefore, when an amount of shake is large, in the image in the image production area AP used in the production of the panoramic image, as depicted in (f) of FIG. 23, the image quality is deteriorated in some cases.

For this reason, even if an amount of shake differs among a plurality of image pickup apparatuses, and thus the image quality difference occurs among the images used in the production of the panoramic image, the panoramic image is produced in such a way that the image quality difference is inconspicuous.

Figure 24:
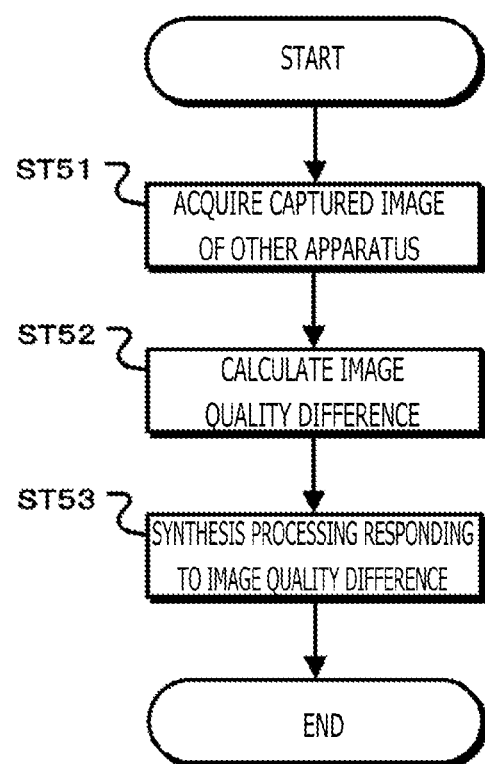
FIG. 24 is a flow chart depicting an operation of a fourth embodiment.

FIG. 24 is a flow chart depicting the operation of the fourth embodiment. In Step ST51, the image pickup apparatus 20-2 acquires the captured image from the other apparatus. The image pickup apparatus 20-2, for example, acquires the captured image PG-1, in the image capturing area AR-1, produced in the image pickup apparatus 20-1, and the processing proceeds to Step ST52.

In Step ST52, the image pickup apparatus 20-2 calculates the image quality difference. The image pickup apparatus 20-2 calculates the image quality difference between the captured image PG-2 produced and the captured image PG-1 acquired from the image pickup apparatus 20-1. The image pickup apparatus 20-2 calculates the difference in the high-frequency components contained in the captured images, the shake degree or the like in the form of the image quality difference. For example, if the blurring occurs in the captured image, then, the high-frequency components are lost. Therefore, when many high-frequency components are contained, the image pickup apparatus 20-2 sets this image quality as the high image quality. When the high-frequency components are not contained so much, the image pickup apparatus 20-2 sets this image quality as the low image quality. In addition, when the shake degree is large, the blurring due to the shake is large, while when the shake degree is small, the blurring is small. For this reason, the image pickup apparatus 20-2 sets the image quality when the shake degree is small as the high image quality, and sets the image quality when the shake degree is large as the low image quality. In this way, the image pickup apparatus 20-2 calculates the difference in the high-frequency components contained in the captured images, the shake degree or the like in the form of the image quality difference. Then, the processing proceeds to Step ST53.

In Step ST53, the image pickup apparatus 20-2 executes the synthesis processing responding to the image quality difference. The image pickup apparatus 20-2 executes image quality adjusting processing for equalizing the image qualities of the captured image PG-1 and the captured image PG-2 on the basis of the calculated image quality difference and connects the captured images after the image quality adjustment to each other, thereby producing the panoramic image. The image pickup apparatus 20-2, for example, may execute low-pass filter processing or the like for the captured image having the high image quality, thereby equalizing the image quality to the captured image having the low image quality, or may execute high image quality processing or the like for the captured image having the low image quality, thereby equalizing the image quality to the captured image having the high image quality. The high-image quality processing, for example, includes noise removing processing, high-frequency emphasizing processing, high-image quality image producing processing by learning, super-resolution processing, and the like. In addition, the image pickup apparatus 20-2 may execute processing for reducing the image quality for the captured image having the high image quality and processing for increasing the image quality for the captured image having the low image quality, thereby equalizing the image qualities of the two captured images. In addition, the image pickup apparatus 20-2 may control the synthesis of the captured image PG-1 and the captured image PG-2 on the basis of the calculated image quality difference, thereby producing the panoramic image so that the image quality difference is inconspicuous. When the two captured images are connected to each other by, for example, using the alpha blending technique, the image pickup apparatus 20-2 adjusts a blend width as a width of the areas to be blended in response to the image quality difference. Thus, when the image quality difference is large, the image pickup apparatus 20-2 widens the blend width to connect the captured images to each other so that the image quality difference is inconspicuous. In addition, the image pickup apparatus 20-2 may adjust a blend rate in response to the image quality difference, and may increase the weight for the captured image having the high image quality when the image quality difference is large, thereby increasing the blend rate of the captured image having the high image quality.

According to such a fourth embodiment, even if in the production of the panoramic image, the image quality difference occurs between the captured images to be connected to each other, the synthesis processing is executed in such a way that the difference in the image quality is inconspicuous. Therefore, it is possible to produce the panoramic image in which the difference in the image quality is inconspicuous.

7. Other Embodiments

Incidentally, in the embodiments described above, there is exemplified the case where the angles of view (an angle representing an image capturing area) of the respective image pickup apparatuses are equal to each other. However, the image pickup apparatuses which are different in angle of view from each other may also be used.

Figure 25:
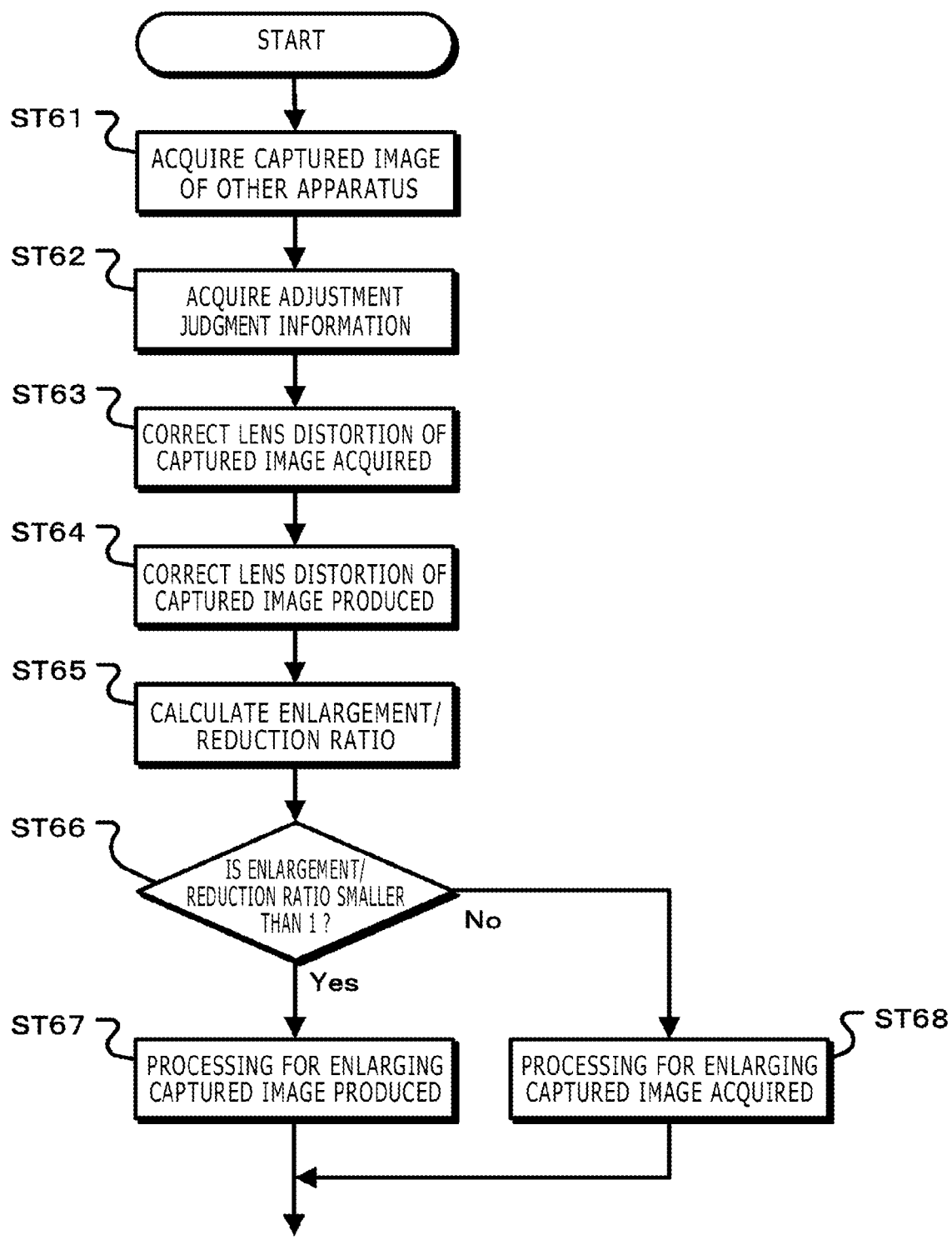
FIG. 25 is a flow chart depicting an operation in the case where image pickup apparatuses different in angle of view from each other are used.

FIG. 25 is a flow chart depicting an operation in the case where the image pickup apparatuses different in angle of view from each other are used. In Step ST61, the image pickup apparatus 20-2 acquires the captured image from the other apparatus. The image pickup apparatus 20-2 acquires, for example, the captured image PG-1 in the image capturing area AR-1 which is produced in the image pickup apparatus 20-1. Then, the processing proceeds to Step ST62.

In Step ST62, the image pickup apparatus 20-2 acquires adjustment judgment information. The image pickup apparatus 20-2 acquires the adjustment judgment information indicating the lens distortion and the angle of view of the captured image PG-1 supplied thereto from the image pickup apparatus 20-1. Here, each of the image pickup apparatuses carries out the calibration in advance so that the adjustment judgment information can be acquired. For example, the image pickup apparatus captures the image of a test chart or the like, and acquires the lens distortion for each focal length in advance to store the lens distortion. Likewise, each of the image pickup apparatuses calculates the angle of view as well for each focal length in advance to store the angle of view. Moreover, the information corresponding to the setting at the time of the image capturing can be read out from the information regarding the lens distortion and the angle of view which are stored, thereby enabling the adjustment judgment information to be acquired. The image pickup apparatus 20-2 acquires the adjustment judgment information, and the processing proceeds to Step ST63.

In Step ST63, the image pickup apparatus 20-2 carries out the correction for the lens distortion of the captured image thus acquired. The image pickup apparatus 20-2 corrects the lens distortion of the captured image PG-1 which is acquired from the image pickup apparatus 20-1 in Step ST61 on the basis of the adjustment judgment information acquired in Step ST62. Then, the processing proceeds to Step ST64.

In Step ST64, the image pickup apparatus 20-2 carries out the correction for the lens distortion of the captured image produced. The image pickup apparatus 20-2 corrects the lens distortion of the captured image PG-2 produced on the basis of the adjustment judgment information when the captured image PG-2 is produced. Then, the processing proceeds to Step ST65.

In Step ST65, the image pickup apparatus 20-2 calculates an enlargement/reduction ratio. The image pickup apparatus 20-2 calculates the ratio of the angle of view of the captured image PG-1 to the angle of view of the captured image PG-2 in the form of the enlargement/reduction ratio from the information regarding the angle of view indicated by the adjustment judgment information regarding the captured image PG-1 and the information regarding the angle of view indicated by the adjustment judgment information regarding the captured image PG-2. Then, the processing proceeds to Step ST66. It should be noted that the calculation of the enlargement/reduction ratio is by no means limited to the case where the adjustment judgment information acquired is used. For example, a plurality of captured images PG-1 having different enlargement/reduction ratios may be prepared, and the captured image PG-1*wp* in which a sum of absolute values of the errors among the pixels in the duplication area with the captured image PG-2 is the smallest may be identified, thereby determining the enlargement/reduction ratio.

In Step ST66, the image pickup apparatus 20-2 judges whether or not the enlargement/reduction ratio is smaller than 1. When the image pickup apparatus 20-2 judges that the enlargement/reduction ratio is smaller than 1, that is, the captured image PG-1 is narrower in angle of view than the captured image PG-2, and thus the object is enlarged to be caught on, the processing proceeds to Step ST67. In addition, when the image pickup apparatus 20-2 judges that the enlargement/reduction ratio is not smaller than 1, for example, the captured image PG-1 is wider in angle of view than the captured image PG-2, and thus the object is an image as a small figure, the processing proceeds to Step ST68.

In Step ST67, the image pickup apparatus 20-2 executes processing for enlarging the angle of view of the captured image produced. The image pickup apparatus 20-2 enlarges the captured image PG-2 produced at a rate of (1/(enlargement/reduction ratio)), and equalizes the angles of view of the captured image PG-1 and the captured image PG-2.

In Step ST68, the image pickup apparatus 20-2 executes angle-of-view enlargement processing of the captured image acquired. The image pickup apparatus 20-2 enlarges the captured image PG-1 acquired at a rate of the enlargement/reduction ratio, thereby equalizing the angles of view of the captured image PG-1 and the captured image PG-2.

After executing such processing, the image pickup apparatus 20-2 produces the panoramic image in the manner as described above. Therefore, even when the image pickup apparatuses different in angle of view from each other are used, it becomes possible to produce the panoramic image for which the sizes of the object are equalized and from which the influence of the lens distortion is removed.

Figure 26:
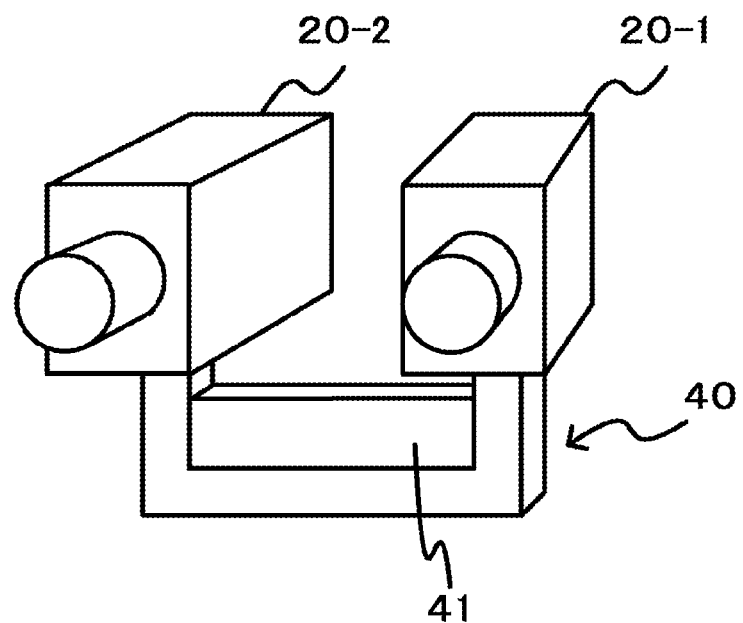
FIG. 26 is a view exemplifying the case where a plurality of image pickup apparatuses are fixed to a rig (mount).

In addition, when a plurality of image pickup apparatuses are fixed to a rig (mount), for example, when, as depicted in FIG. 26, the image pickup apparatuses 20-1 and 20-2 are mounted to a rig 40, thereby determining an amount of overlapping of the images, information regarding the mounting is produced as the duplication identification information. In addition, when a mounting angle of the image pickup apparatus is selectable for the rig, and an amount of overlapping of the images is determined in response to the selected mounting angle, information indicating the mounting angle is produced as the duplication identification information. Moreover, when the image pickup apparatus is mounted to the rig, so that the image pickup apparatus is set to a predetermined focal length, thereby determining an amount of overlapping of the images, or when the image pickup apparatus is set to a focal length selected in the rig to which the image pickup apparatus is mounted, thereby determining an amount of overlapping of the images, information indicating the focal length to which the image pickup apparatus is set may be contained in the duplication identification information.

The duplication identification information regarding such mounting may be produced in any of the rig or the image pickup apparatus. For example, a detection portion 41 for detecting the mounting of the image pickup apparatuses 20-1 and 20-2 is provided in the rig 40. The detection portion 41 may use a communication function, or may utilize a mechanical connection mechanism. When the communication function is used, a communication with the rig 40 is made through a connection terminal, a connection cable or the like, thereby detecting the mounting. In addition, a short-range wireless communication may be made with the rig 40, thereby detecting the mounting to the rig 40. In addition, when the mechanical connection mechanism is used, the mounting is detected on the basis of a manipulation position or the like of a manipulation lever which is manipulated when the image pickup apparatus is fixed. Incidentally, for detection of the mounting, not only the mounting of the image pickup apparatus to the rig, but also the detection of the mounting angle or the focal length, or the like may be carried out. The rig 40 transmits the duplication identification information to the image pickup apparatus 20-2 using the communication function.

When the image pickup apparatuses are mounted to the rig in such a way, thereby producing the duplication identification information, even if no image capturing operation is carried out, the judgment of an amount of overlapping of the images can be carried out. Therefore, for example, in the operation depicted in FIG. 8, the pieces of processing from Step ST1 to Step ST3 may be executed in advance by using the duplication identification information regarding the mounting instead of using the captured image from the other apparatus, and the processing in Step ST5 or Step ST6 may be executed by using the judgment result in Step ST3 which is obtained in advance.

In addition, when a plurality of image pickup apparatuses are fixed to the rig, the positional relation between the image pickup apparatuses 20-1 and 20-2 is small in change. Therefore, in such a case, it is possible to prevent the position alignment from being unnecessarily carried out in such a way that the frequency of the position alignment is reduced and the observation time period or the observation interval of the degree of the change in positional relation is lengthened.

Moreover, the image stabilization is by no means limited to the case of the electronic image stabilization for adjusting the position of the image production area in response to the shake, and may be optical image stabilization. For example, when an image sensor shift system is used as the optical image stabilization, since the image sensor shift system is a system for moving a position of the image sensor in response to the shake, the processing similar to that in the case where the image production area is moved can be executed. In addition, for example, when a lens shift system is used as the optical image stabilization, there are provided a lens for adjusting focus and a lens for image stabilization. In the lens shift system, for the purpose of correcting the shake, a position of an optical axis passes through end portion sides of the lens for adjusting the focus and the lens for the image stabilization in some cases, and thus the lens distortion of the captured image becomes large depending on the position of the optical axis. In addition, in the case as well of the image sensor shift system, if the image sensor is moved to a position away from the optical axis, then, the lens distortion becomes large. In such cases, by applying the fourth embodiment described above, the panoramic image in which the image quality difference is small can be produced.

In addition, in each of the embodiments described above, although in the description of the flow chart depicting the operation, the image pickup system 10 adopts the configuration depicted in (b) of FIG. 1, alternatively, the image pickup system 10 may adopt any of the configurations depicted in (c) to (f) of FIG. 1. In this case, it is only necessary that the image pickup apparatus or the information processing apparatus having the function capable of executing the processing in Steps executes the processing in Steps in order of Steps. For example, when the image pickup system 10 adopts the configuration depicted in (c) of FIG. 1, the pieces of processing such as following are executed: an external apparatus calculates an amount of overlapping, an external apparatus limits the image stabilization for the image pickup apparatus, and an external apparatus produces the panoramic image, on the basis of the panoramic information produced in the image pickup apparatus. In addition, when the image pickup system 10 adopts the configuration depicted in (d) of FIG. 1, the pieces of processing such as following may be executed: the information processing apparatus calculates an amount of overlapping, limits the image stabilization for the image pickup apparatus, and produces the panoramic image.

In addition, although in each of the embodiments described above, the description is given with respect to the case where the image pickup apparatus 20-2 carries out the control for the image stabilization and the production of the panoramic image, as described above, alternatively, the information processing apparatus 50 may carry out the control for the image stabilization, the production of the panoramic image, and the like.

Moreover, this technique can be widely utilized in the field or the like which requires an image having a wide angle of view under the environment in which the shake of the image pickup portion is generated. For example, if the image pickup apparatuses are mounted to a vehicle, then, even when vibrations are applied to the image pickup apparatuses during the traveling, the satisfactory panoramic image can be produced, and thus the situations of the circumstances can be confirmed during the driving. In addition, even when automatic driving or the like is carried out, the situations of the circumstances can be acquired. In addition, if the image pickup apparatuses are mounted to construction machinery, agriculture machinery or the like, then, even when the vibration or the like is applied to the image pickup apparatuses during a work, the satisfactory panoramic image can be produced. Therefore, the work can be properly carried out while the situations of the circumstances are confirmed.

The series of processing described above in the description can be executed by hardware, or software, or a composite configuration of both of them. When the processing by the software is executed, a program in which a processing sequence is recorded is installed in a memory within a computer incorporated in the dedicated hardware in order to execute the program. Alternatively, a program can be installed in a general-purpose computer which can execute various kinds of processing in order to execute the program.

For example, a program can be recorded in a hard disc, an SSD (Solid State Drive) or a ROM (Read Only Memory) as a recording medium in advance. Alternatively, a program can be temporarily or permanently stored (recorded) in a removable recording medium such as a flexible disc, a CD-ROM (Compact Disc Read Only Memory), an MO (Magneto optical) disc, a DVD (Digital Versatile Disc), a BD (Blu-Ray Disc (registered trademark)), a magnetic disc, or a semiconductor memory card. Such a removable recording medium can be presented as the so-called package software.

In addition, a program may be installed from a removal recording medium in a computer, and in addition thereto, may be transferred to a computer in a wireless or wired manner from a download site through a network such as a LAN (Local Area Network) or the Internet. The computer can receive a program transferred thereto in such a manner, and can install in a recording medium such as a hard disc built therein.

It should be noted that the effects described in the present description are merely the exemplifications, and are by no means limited and additional effects, not described herein, may be offered. In addition, the present technique should not be interpreted in a limiting sense. In the embodiments of the present technique, the present technique is disclosed in the form of the exemplifications, and it is obvious that a person skilled in the art can make modifications and substitutions of the embodiments without departing from the subject matter of the present technique. That is to say, for judging the subject matter of the present technique, claims should be taken into consideration.

In addition, the image processing apparatus of the present technique can also adopt the following constitutions.

(1) An image processing apparatus, including:
a control portion configured to carry out control about image stabilization for at least one of a first captured image and a second captured image, which are used in production of a panoramic image, in response to a positional relation between the first captured image and the second captured image.

(2) The image processing apparatus according to (1), in which the control portion limits the image stabilization in response to the positional relation as the control about the image stabilization.

(3) The image processing apparatus according to (2), in which the positional relation is an amount of overlapping.

(4) The image processing apparatus according to (3), in which the control portion limits the image stabilization when the amount of overlapping is equal to or smaller than an image stabilization limitation threshold value.

(5) The image processing apparatus according to (3) or (4), in which the control portion limits the image stabilization in such a way that an image production area provided within a valid pixel area of an image sensor is widened as the amount of overlapping becomes smaller.

(6) The image processing apparatus according to (2), in which the control portion stops the image stabilization as the limitation about the image stabilization.

(7) The image processing apparatus according to any one of (2) to (5), further including:
a notification processing portion configured to carry out a notification for a user,
in which the control portion carries out a notification about setting of the image stabilization through the notification processing portion as the limitation about the image stabilization.

(8) The image processing apparatus according to (3), in which the control portion carries out the control in order of execution of position alignment between an image production area of the first captured image and an image production area of the second captured image and execution of the image stabilization when the amount of overlapping is equal to or smaller than a processing order setting threshold value, and carries out the control in order of the execution of the image stabilization and the execution of the position alignment when the amount of overlapping is larger than the processing order setting threshold value.

(9) The image processing apparatus according to any one of (1) to (8), in which the control portion carries out position alignment between the first captured image and the second captured image in response to a degree of a change in the positional relation between the first captured image and the second captured image.

(10) The image processing apparatus according to (9), in which the control portion controls an observation time period or an observation interval of the degree of the change in response to the degree of the change.

(11) The image processing apparatus according to (10), in which the control portion shortens the observation time period or the observation interval as the degree of the change becomes larger, and lengthens the observation time period or the observation interval as the degree of the change becomes smaller.

(12) The image processing apparatus according to (9), in which a frequency of the position alignment is controlled in response to a mounting state of a first image pickup portion configured to produce the first captured image and a second image pickup portion configured to produce the second captured image.

(13) The image processing apparatus according to any one of (1) to (12), further including:
a panoramic image producing portion configured to produce a panoramic image from an image production area of the first captured image and an image production area of the second captured image.

(14) The image processing apparatus according to (13), in which the panoramic image producing portion produces the panoramic image after an image quality difference between the image production area of the first captured image and the image production area of the second captured image is adjusted.

(15) The image processing apparatus according to (13) or (14), in which the panoramic image producing portion synthesizes the image production area of the first captured image in which lens distortion is corrected and the image production area of the second captured image in which the lens distortion is corrected.

(16) The image processing apparatus according to any one of (13) to (15), in which the panoramic image producing portion produces the panoramic image after an angle of view of the first captured image and an angle of view of the second captured image are equalized.

Moreover, the image processing apparatus of the present technique can also adopt the following constitutions.

An image processing apparatus including a control portion configured to carry out control about an image stabilization function of at least one of an image pickup apparatus configured to produce a first captured image and a second image pickup apparatus configured to produce a second captured image in response to a difference in shake between the first image pickup apparatus and the second pickup apparatus as control about production of the first captured image and the second captured image in order to produce a panoramic image by processing for synthesizing the first and second captured images.

An image processing apparatus including a control portion configured to control an image stabilization function of at least one of a first image pickup apparatus and a second image pickup apparatus in response to a difference in shake between the first and second image pickup apparatuses as control about production of a first captured image in the first image pickup apparatus used in production of a panoramic image, and production of a second captured image in the second image pickup apparatus used in production of the panoramic image.

INDUSTRIAL APPLICABILITY

In an image processing apparatus, an image processing method, a program, and an image pickup system of this technique, control about image stabilization for at least one of a first captured image and a second captured image which are used in production of a panoramic image is carried out in response to a positional relation between the first captured image and the second captured image. For this reason, by the control about the image stabilization responding to the positional relation between the first captured image and the second captured image, areas in which the captured images of the same object overlap each other can be ensured in the first captured image and the second captured image. Thus, the images used in the production of the panoramic image can be readily produced. Therefore, this technique can be widely utilized to the field or the like which requires an image having a wide angle of view under an environment in which shake of an image pickup portion is generated.

REFERENCE SIGNS LIST

10 . . . Image pickup system
20, 20-1 to 20-8 . . . Image pickup apparatus
30 . . . Recording medium
40 . . . Rig
41 . . . Mounting state detecting portion
50, 50-1, 50-2 . . . Information processing apparatus
200 . . . Lens unit
201 . . . Drive portion
202 . . . Image sensor portion
203 . . . AFE portion
204 . . . Image processing portion
205 . . . Display portion
206 . . . Voice input/output portion
207, 503 . . . Communication portion
208 . . . Recording medium processing portion
209, 506 . . . Bus
211 . . . Sensor portion
212 . . . User interface portion
220, 505 . . . Control portion
501 . . . Input portion
502 . . . Output portion
504 . . . Storage portion

The invention claimed is:
1. An image processing apparatus, comprising:
a controller configured to control at least one of a first image stabilizer or a second image stabilizer, the first image stabilizer corresponding to a first captured image, the second image stabilizer corresponding to a second captured image, in response to a positional relation between the first captured image and the second captured image, wherein
the first captured image is produced by a first image pickup and the second captured image is produced by a second image pickup,
the first image stabilizer is configured to execute a first image stabilization on the first captured image and the second image stabilizer is configured to execute a second image stabilization on the second captured image, the first captured image and the second captured image are used in production of a panoramic image in correspondence with the control of the at least one of the first image stabilizer or the second image stabilizer, the controller is configured to limit at least one of the first image stabilization or the second image stabilization in response to the positional relation as the control, the positional relation is an amount of overlapping, and the controller is configured to limit at least one of the first image stabilization or the second image stabilization when the amount of overlapping is equal to or smaller than an image stabilization limitation threshold value.

2. The image processing apparatus according to claim 1, wherein the controller is configured to limit at least one of the first image stabilization or the second image stabilization in such a way that an image production area provided within a valid pixel area of an image sensor is widened as the amount of overlapping becomes smaller.

3. The image processing apparatus according to claim 1, wherein the controller is configured to stop at least one of the first image stabilization or the second image stabilization as the control.

4. The image processing apparatus according to claim 1, further comprising:
a notification processing portion configured to carry out a notification for a user,
wherein the controller is configured to carry out a notification about setting of at least one of the first image stabilization or the second image stabilization through the notification processing portion.

5. The image processing apparatus according to claim 1, wherein the controller is configured to carry out the control in order of execution of position alignment between an image production area of the first captured image and an image production area of the second captured image and execution of at least one of the first image stabilization or the second image stabilization when the amount of overlapping is equal to or smaller than a processing order setting threshold value, and carries out the control in order of the execution of at least one of the first image stabilization or the second image stabilization and the execution of the position alignment when the amount of overlapping is larger than the processing order setting threshold value.

6. The image processing apparatus according to claim 1, wherein the controller is configured to carry out position alignment between an image production area of the first captured image and an image production area of the second captured image in response to a degree of a change in the positional relation between the first captured image and the second captured image.

7. The image processing apparatus according to claim 6, wherein the controller is configured to control an observation time period or an observation interval of the degree of the change in response to the degree of the change.

8. The image processing apparatus according to claim 7, wherein the controller is configured to shorten the observation time period or the observation interval as the degree of the change becomes larger, and lengthen the observation time period or the observation interval as the degree of the change becomes smaller.

9. The image processing apparatus according to claim 6, wherein a frequency of the position alignment is controlled in response to a mounting state of the first image pickup and the second image pickup.

10. The image processing apparatus according to claim 1, further comprising:
a panoramic image producing portion configured to produce the panoramic image from an image production area of the first captured image, and an image production area of the second captured image.

11. The image processing apparatus according to claim 10, wherein the panoramic image producing portion produces the panoramic image after an image quality difference between the image production area of the first captured image and the image production area of the second captured image is adjusted.

12. The image processing apparatus according to claim 10, wherein the panoramic image producing portion synthesizes the image production area of the first captured image in which lens distortion is corrected and the image production area of the second captured image in which the lens distortion is corrected.

13. The image processing apparatus according to claim 10, wherein the panoramic image producing portion produces the panoramic image after an angle of view of the first captured image and an angle of view of the second captured image are equalized.

14. An image processing method, comprising:
controlling at least one of a first image stabilizer corresponding to a first captured image or a second image stabilizer corresponding to a second captured image, in response to a positional relation between the first captured image and the second captured image, wherein
the first captured image is produced by a first image pickup portion and the second captured image is produced by a second image pickup portion,
the first image stabilizer is configured to execute a first image stabilization on the first captured image and the second image stabilizer is configured to execute a second image stabilization on the second captured image, and
the first captured image and the second captured image are used in production of a panoramic image in correspondence with controlling the at least one of the first image stabilizer or the second image stabilizer, wherein
the controlling limits at least one of the first image stabilization or the second image stabilization in response to the positional relation as the control,
the positional relation is an amount of overlapping, and
the controlling limits at least one of the first image stabilization or the second image stabilization when the amount of overlapping is equal to or smaller than an image stabilization limitation threshold value.

15. A non-transitory computer readable medium storing a program executable by a computer to perform operations comprising:
controlling at least one of a first image stabilizer corresponding to a first captured image or a second image stabilizer corresponding to a second captured image, in response to a positional relation between the first captured image and the second captured image, wherein
the first captured image is produced by a first image pickup and the second captured image is produced by a second image pickup,
the first image stabilizer is configured to execute a first image stabilization on the first captured image and the second image stabilizer is configured to execute a second image stabilization on the second captured image, and the first captured image and the second captured image are used in production of a panoramic image in correspondence with controlling the at least one of the first image stabilizer or the second image stabilizer, wherein the controlling limits at least one of the first image stabilization or the second image stabilization in response to the positional relation as the control, the positional relation is an amount of overlapping, and the controlling limits at least one of the first image stabilization or the second image stabilization when the amount of overlapping is equal to or smaller than an image stabilization limitation threshold value.

16. An image pickup system, comprising:

a first image pickup configured to produce a first captured image to be used in production of a panoramic image;

a second image pickup configured to produce a second captured image to be used in production of the panoramic image;

a first image stabilizer configured to execute a first image stabilization on the first captured image;

a second image stabilizer configured to execute a second image stabilization on the second captured image; and a controller configured to control of at least one of the first image stabilizer or the second image stabilizer in response to a positional relation between the first captured image and the second captured image, wherein the controller is configured to limit at least one of the first image stabilization or the second image stabilization in response to the positional relation as the control, the positional relation is an amount of overlapping, and the controller is configured to limit at least one of the first image stabilization or the second image stabilization when the amount of overlapping is equal to or smaller than an image stabilization limitation threshold value.

17. The image processing apparatus according to claim 1, wherein the first image pickup and the second image pickup capture the first captured image and the second captured image in parallel.

18. The image processing apparatus according to claim 1, wherein the first image pickup and the second image pickup capture the first captured image and the second captured image simultaneously.

19. The image processing apparatus according to claim 1, wherein the controller is configured to limit at least one of the first image stabilization or the second image stabilization such that the first captured image and the second captured image include a same object used for determining the positional relation.

* * * * *